(12) United States Patent
Leahy

(10) Patent No.: US 9,390,249 B2
(45) Date of Patent: Jul. 12, 2016

(54) SYSTEM AND METHOD FOR IMPROVING SECURITY OF USER ACCOUNT ACCESS

(75) Inventor: Louis Leahy, North Richmond (AU)

(73) Assignee: ARMORLOG LTD, Isle of Man (GB)

( * ) Notice: Subject to any disclaimer, the term of this patent is extended or adjusted under 35 U.S.C. 154(b) by 76 days.

(21) Appl. No.: 13/502,118

(22) PCT Filed: Oct. 14, 2010

(86) PCT No.: PCT/AU2010/001360
§ 371 (c)(1),
(2), (4) Date: Apr. 13, 2012

(87) PCT Pub. No.: WO2011/044630
PCT Pub. Date: Apr. 21, 2011

(65) Prior Publication Data
US 2012/0204247 A1    Aug. 9, 2012

(30) Foreign Application Priority Data

Oct. 16, 2009    (AU) ................................. 2009905040

(51) Int. Cl.
*G06F 7/04*      (2006.01)
*G06F 21/36*     (2013.01)

(52) U.S. Cl.
CPC ........ *G06F 21/36* (2013.01); *G06F 2221/2113* (2013.01)

(58) Field of Classification Search
CPC ............... G06F 3/04886; G06F 21/83; G06F 2221/2141; G06F 21/31; G06F 21/36; G07F 7/10; G07F 17/3206; G07F 17/3241; G07F 17/323; H04W 12/06; H04L 63/08; H04L 63/083
See application file for complete search history.

(56) References Cited

U.S. PATENT DOCUMENTS

| 6,630,928 B1 * | 10/2003 | McIntyre et al. ............. 345/173 |
| 2004/0049685 A1 | 3/2004 | Jaloveczki |
| 2004/0113819 A1 | 6/2004 | Gauthey et al. |

(Continued)

FOREIGN PATENT DOCUMENTS

GB    2 313 460 A    11/1997

*Primary Examiner* — Shewaye Gelagay
*Assistant Examiner* — Carlton Johnson
(74) *Attorney, Agent, or Firm* — Birch, Stewart, Kolasch & Birch, LLP

(57) ABSTRACT

A system and method for providing access to a user account is provided, and in particular for improving the security to a user when entering access details, for example when logging on to Internet sites, networks, software and web applications. On one form, there is a system for providing access to a user account via an electronic device having a visual display screen, including communication means for issuing at least one security identifier to the user, said security identifier including one or more characters chosen from a predetermined character set; a database for storing said at least one security identifier and said predetermined character set; a processor for providing an access interface on said visual display screen for said user to input said security identifier, wherein said access interface includes a graphical display character set which includes at least the characters comprising the security identifier; and for comparing said security identifier entered by said user on the graphical display character set to the security identifier stored in said database, and for comparing said security identifier entered to a predetermined security identifier stored in said database, and if comparison is successful, providing access to said user account.

27 Claims, 21 Drawing Sheets

(56) References Cited

U.S. PATENT DOCUMENTS

| | | |
|---|---|---|
| 2007/0046423 A1 | 3/2007 | Baucom |
| 2007/0277224 A1 | 11/2007 | Osborn et al. |
| 2008/0214298 A1* | 9/2008 | Byng .............................. 463/29 |
| 2009/0070881 A1 | 3/2009 | Yellepeddy et al. |
| 2009/0077653 A1* | 3/2009 | Osborn et al. .................. 726/17 |

* cited by examiner

FIGURE 7

Character Selection Database

Character Set Master Table

FIGURE 10

Character Selection Database

Character Set Master Table

| Standard Character Range (appear in every set) | AD51:L52,H53:AG53 |
|---|---|
| Required Character Range (do not include excluded characters) | H54:AG58 |
| Excluded Character Range (do not include required characters) | H59:AG60 |

FIGURE 11

SYSTEM AND METHOD FOR IMPROVING SECURITY OF USER ACCOUNT ACCESS

This application is the National Stage under 35 USC §371 of International Application Number PCT/AU2010/001360 filed on Oct. 14, 2010, which claims priority under 35 USC §119(a)-(d) of Application Number 2009905040 filed on Oct. 16, 2009 in Australia.

FIELD OF THE INVENTION

The present invention relates to a system and method for providing access to a user account, and in particular for improving the security to a user when entering access details, for example when logging on to Internet sites, networks, software and web applications, and the like.

BACKGROUND TO THE INVENTION

It is known for a user to log into accounts on networks, Internet sites, software and web applications, cellular phones and the like by inputting identification details through a keypad or keyboard. For example, financial institutions provide Internet banking services where users are required to enter a username and password via a keyboard to access their account information, transfer funds, pay bills, and the like. Even automated teller machines (ATMs) require user identification and a password in the form of a PIN.

Entering usernames and passwords using a keyboard over networks, and particularly public networks such as the Internet, involves some risk to users. Third parties have invented various schemes to gain unauthorised access to usernames and passwords, for example through keyboard logging, skimming devices, password guessers and phishing.

Keyboard logging is the practice of noting the keys struck on a keyboard, typically in a covert manner so that the person using the keyboard is unaware that their actions are being monitored. This is typically performed through installing software programs on a user's computer, unbeknown to the user.

Skimming devices are connected to computer hardware, for example an automated teller machine, and collect information from a user as it is inputted into the keypad. For example, a skimming device connected to an automated teller machine may collect account details, usernames, passwords and PINs of an institution's customers, again unbeknown to the customer.

Password guessing programs enable automated attempts at guessing a user's password, for example by running through the entirety of words in a dictionary at a very rapid speed.

Phishing is the process of attempting to acquire sensitive information, such as usernames, passwords and credit card details for example, by masquerading as a trustworthy entity in an electronic communication. Typically users are sent an email which appears to the user to be a legitimate email from a trusted institution which asks the user to click through a link and enter in their username and password. The link does not however take the user to the legitimate institution website but rather to a false website operated by a third party, thereby allowing the third party to obtain the username and password of the user.

Due to the inherent security risks, many customers refuse to engage in Internet or phone based transactions. This is not only an inconvenience to the customer but also to the institution who cannot implement their entire business solely online if desired.

Existing attempts to solve the above security problems focus on preventing installation of such devices and software, however they do not assist when such devices and software are successfully installed. Nor do they assist in preventing all of the above security threats.

Password guessing programs can be defeated by account lock out mechanisms, but these are often not used on networks because of capacity and user database management constraints. Where they are used, they are typically set to low tolerances to avoid the customer being inadvertently inconvenienced.

Digital certificates are used to prevent unauthorised use of user names and passwords, but in high end applications this does not prevent access if the device security is breached or the digital certificate is stolen. Digital certificates also require a significant degree of skill by the end user to implement, often to such an extent that assistance of a technician for most users is required. This renders the use of digital certificates for Internet and WAN based applications cost prohibitive, as significant help desk resources are required by the institution, as well as higher costs for the end user in obtaining onsite technical assistance. Digital certificate management is being further complicated by the evolving numbers of operating systems that must be tailored to work with the digital certificate. This will become even more apparent with the wider use of cellular network enabled devices to access the Internet each with their own proprietary operating systems.

One currently available system which was designed to prevent phishing attacks is known as "SiteKey". SiteKey is a web-based security authentication system which ask a series of identity questions to increase security. A user identifies him/herself to a website by entering his/her username (but not password). If the username is valid, an image and accompanying phrase is displayed which has been previously configured to the user. If the user does not recognise the image and phrase as his/her own, the user assumes the site is a phishing site and abandons the login. If the user does recognise the image and phrase, the user may consider the site authentic and proceed with the login process.

However weaknesses have been found in the SiteKey system. Most importantly, it offers no immunity against some of the most common phishing scenarios, as it compromises user privacy by requiring users to disclose personal information in response to the questions, it is susceptible to man-in-the-middle attack, and it allows bulk harvesting of usernames. It has also been found that users are prone to provide their login credentials even in the absence of the SiteKey image and phrase appearing. Accordingly, it has not been entirely successful and has in some cases lead to increased incidents of identity theft because personal information is exposed and the phisher can still illicit information from targets relatively easily.

There is accordingly a need for improving the security to a user when entering login credentials to access a user account, to inhibit at least some of the above described security threats.

SUMMARY OF THE INVENTION

Broadly, the present invention uses a graphical display access interface to display a predetermined character set for the user to select one or more characters which comprise at least one unique security identifier.

In one aspect, there is provided a method for providing access to a user account via an electronic device having a visual display screen, the method including the steps of: issuing at least one security identifier to the user, said security identifier including one or more characters chosen from a predetermined character set; providing an access interface on said visual display screen for said user to input said security identifier, wherein said access interface includes a graphical display character set which includes at least the characters comprising the security identifier; allowing said user to input said security identifier by selecting characters on the graphical display character set; and comparing said entered security identifier to a predetermined security identifier stored in a database, and if comparison is successful, providing access to said user account.

In a second aspect, there is provided a system for providing access to a user account via an electronic device having a visual display screen, including: communication means for issuing at least one security identifier to the user, said security identifier including one or more characters chosen from a predetermined character set; a database for storing said at least one security identifier and said predetermined character set; a processor for providing an access interface on said visual display screen for said user to input said security identifier, wherein said access interface includes a graphical display character set which includes at least the characters comprising the security identifier; and for comparing said security identifier entered by said user on the graphical display character set to the security identifier stored in said database, and for comparing said security identifier entered to a predetermined security identifier stored in said database, and if comparison is successful, providing access to said user account.

In a third aspect, there is provided a system for providing access to a user account via an electronic device having a visual display screen, including: first communication means for receiving at least one security identifier, said security identifier including one or more characters chosen from a predetermined character set; an electronic device having a visual display screen adapted for requesting access to a user account, and for receiving an access interface to input said security identifier, wherein the access interface includes a graphical display character set which includes at least the characters comprising the security identifier, and for accessing said user account if comparison between said security identifier entered to a predetermined security identifier stored in a database is successful.

In a fourth aspect, there is provided a system for providing access to a user account, including: communication means for receiving a request to access said user account, and for sending an access interface in response to said request, wherein the access interface includes a graphical display character set which includes at least the characters comprising a security identifier having one or more characters chosen from a predetermined character set; and a processor for receiving and comparing said security identifier to a predetermined security identifier stored in a database, and if comparison is successful, providing access to said user account.

There is further provided a software product operatively adapted to implement the method of the first aspect.

In one form, the predetermined character set is unique to a subset of users. This enhances the security of the system since the set of characters is different for different user or subsets of users, increasing the possible number of characters to be guessed in a password guessing program for example.

In another form, the predetermined character set is proprietary to the user account administrator. Again, a password guessing program for example would have difficulty determining the character set for a user since each administrator, for example each institution, can design their own character set. Combined with different character sets for subsets of users provides even more security.

Preferably, the user is required to progressively input more than one security identifier, ideally with each of these on a separate login screen with separate customised graphical display character set to enhance security. For example, the user may need to enter a username, followed by a password, and followed by a PIN. In other forms, the same character set may be used for each login screen, or there may be only a single login screen.

The predetermined character set for each issued security identifier may be different, again assisting with enhancing security of the access system.

It is preferred that the user inputs the security identifier by selecting the characters on the graphical display character set via a pointer driven device or a touch screen. In this way, key loggers are inhibited from recording keystrokes on a traditional keyboard and thereby causing unauthorised access to a user's details. However, in another form a selection of keyboard keys could be used to select the characters displayed, for example the tab and arrow keys.

Alternatively, the user may input a part of the security identifier by selecting at least one character on the graphical display character set, and part of the security identifier by selecting keys on a traditional keyboard.

Advantageously, the graphical display character set may be displayed in different orders or orientations for each attempted access, to further inhibit key loggers from accessing user details.

To inhibit password guessing programs, it is preferred that access to the user account is rejected if an incorrect security identifier is inputted a predetermined number of times. Furthermore, it is also preferred that access to the user account is rejected if an excluded character is selected, ie a character that is outside the allowed graphical display character set.

In another form, the predetermined character set and security identifier may be variable for each user to increase the numbers of possible options and increase the difficulty in guessing a user's identifier.

For some administrators or institutions, the access interface may further include an advertising display to allow an administrator to obtain additional financial benefits from use of its system.

Forms of the present invention improve security to a user when entering identification details to access a user account by inhibiting the threats of keyboard logging, skimming devices, password guessers and/or phishing. For example, phishing scams will be defeated by the use of a customized graphical key character set unique for each user that is linked to their fixed account name and will only be presented to them at logon. In this way if the customer is tricked in to going to an invalid site it will not have the necessary custom character set to enable the client to input their security ID. This is compounded if multiple login screens with different character sets are deployed. Key logging will also be defeated by failing to use known keyboard layouts, and in particular standard keyboards, to enter security IDs. Furthermore, even if key strokes are captured the value of the selected character will be unknown to a third party, and if the character layout is varied for each login, will be very difficult for a third party to log or guess. Password guessers will also be defeated by failing to include standard alphabet and numerical characters in a security ID, and furthermore by using characters proprietary to an administrator/institution will make the guessing a password very difficult. Randomising the order and location of the characters during login inhibits the ability for skimming device access to a security ID.

It is envisaged that this invention will also help to protect against domain address spoofing, hijacking and redirection techniques that divert legitimate internet traffic to a false site to harvest user login credentials intermittently, as it will not be possible for the user to enter their codes as the required character sets will not exist.

BRIEF DESCRIPTION OF THE DRAWINGS

An illustrative embodiment of the present invention will now be described with reference to the accompanying figures. Further features and advantages of the invention will also become apparent from the accompanying description.

FIG. 7 is an exemplary security ID creation access interface and graphical display character set;

FIG. 10 is an exemplary master character set table;

FIG. 11 is another exemplary master character set table; and

DESCRIPTION OF PREFERRED EMBODIMENT

The present invention is not specific to any particular hardware or software implementation, and is at a conceptual level above specifics of implementation. It is to be understood that various other embodiments and variations of the invention may be produced without departing from the spirit or scope of the invention. The following is provided to assist in understanding the practical implementation of particular embodiments of the invention.

Figure 1:
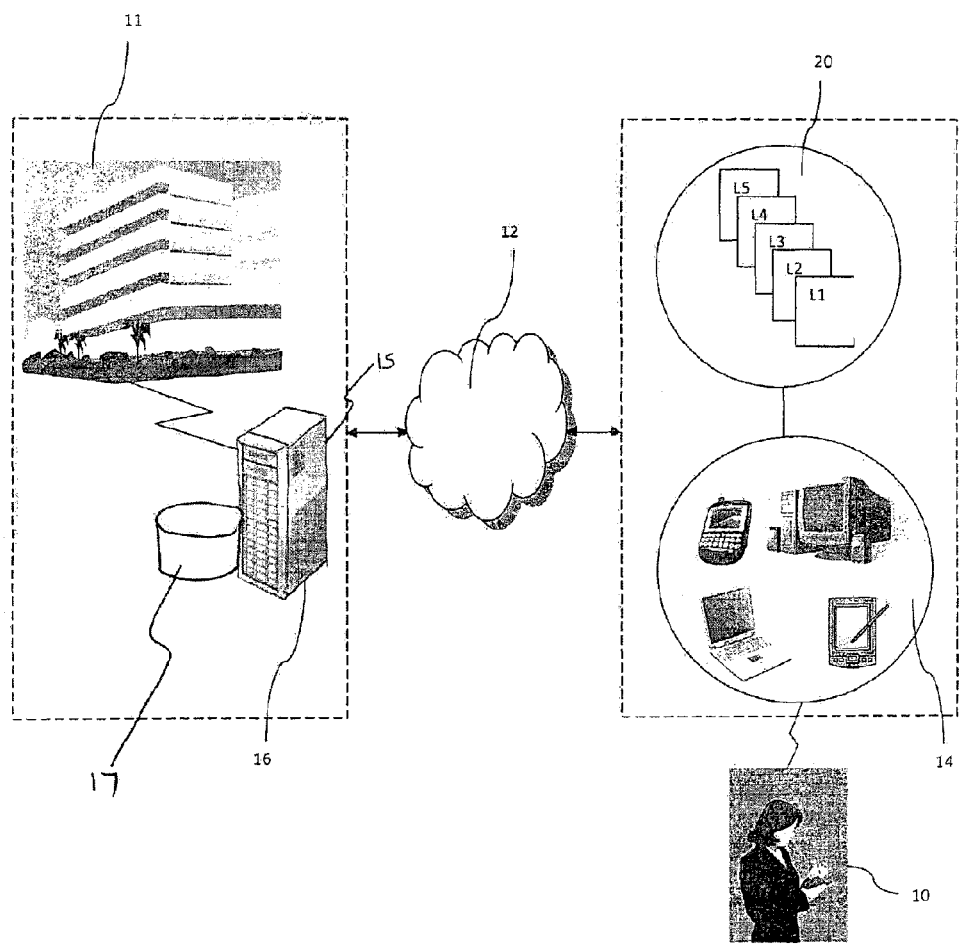
FIG. 1 is a contextual diagram providing an overview of the system in one embodiment of the present invention.
Figure 2A:
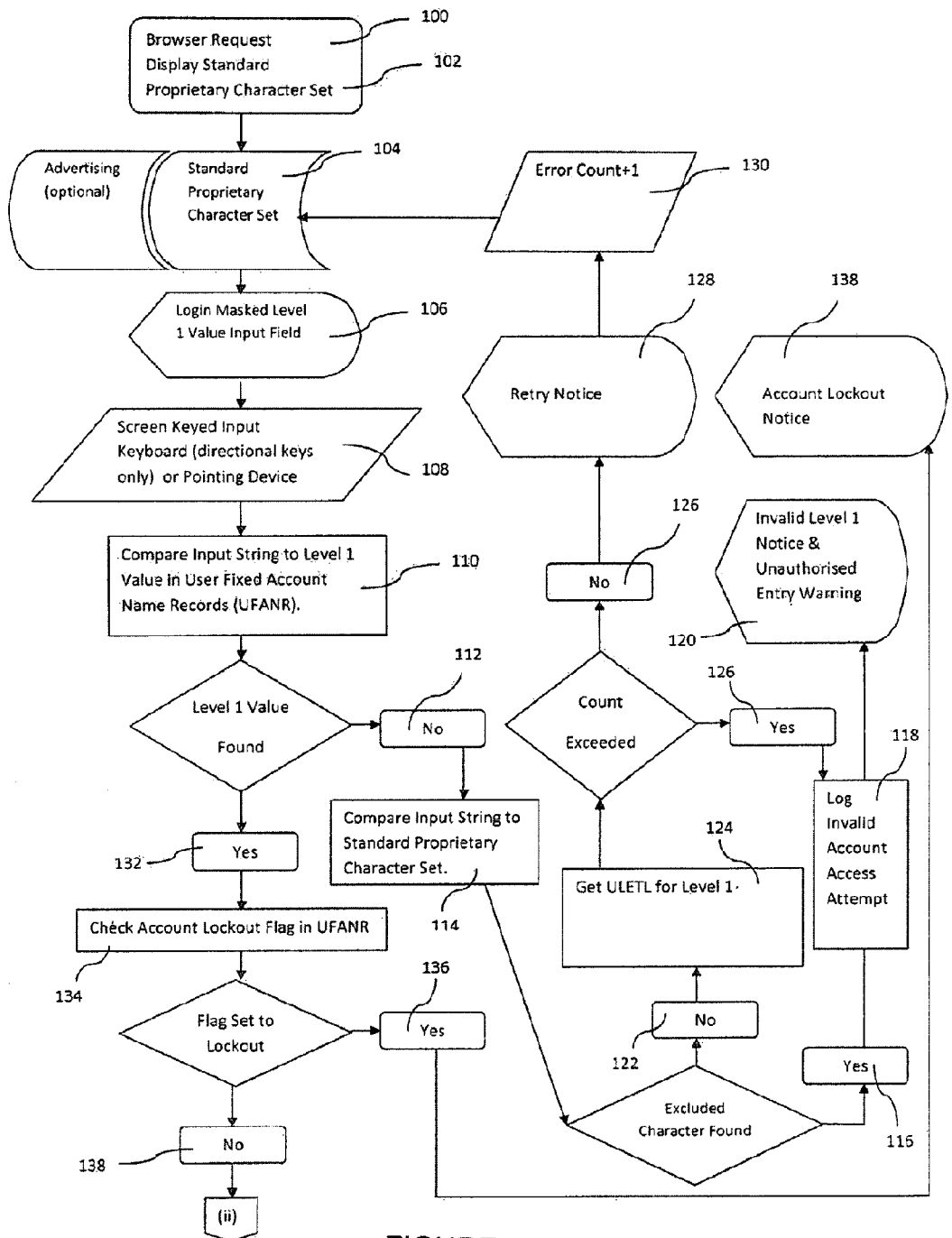
FIGS. 2a to 2j (hereinafter "FIG. 2") show a flowchart of an exemplary method for implementing the present invention.
Figure 2B:
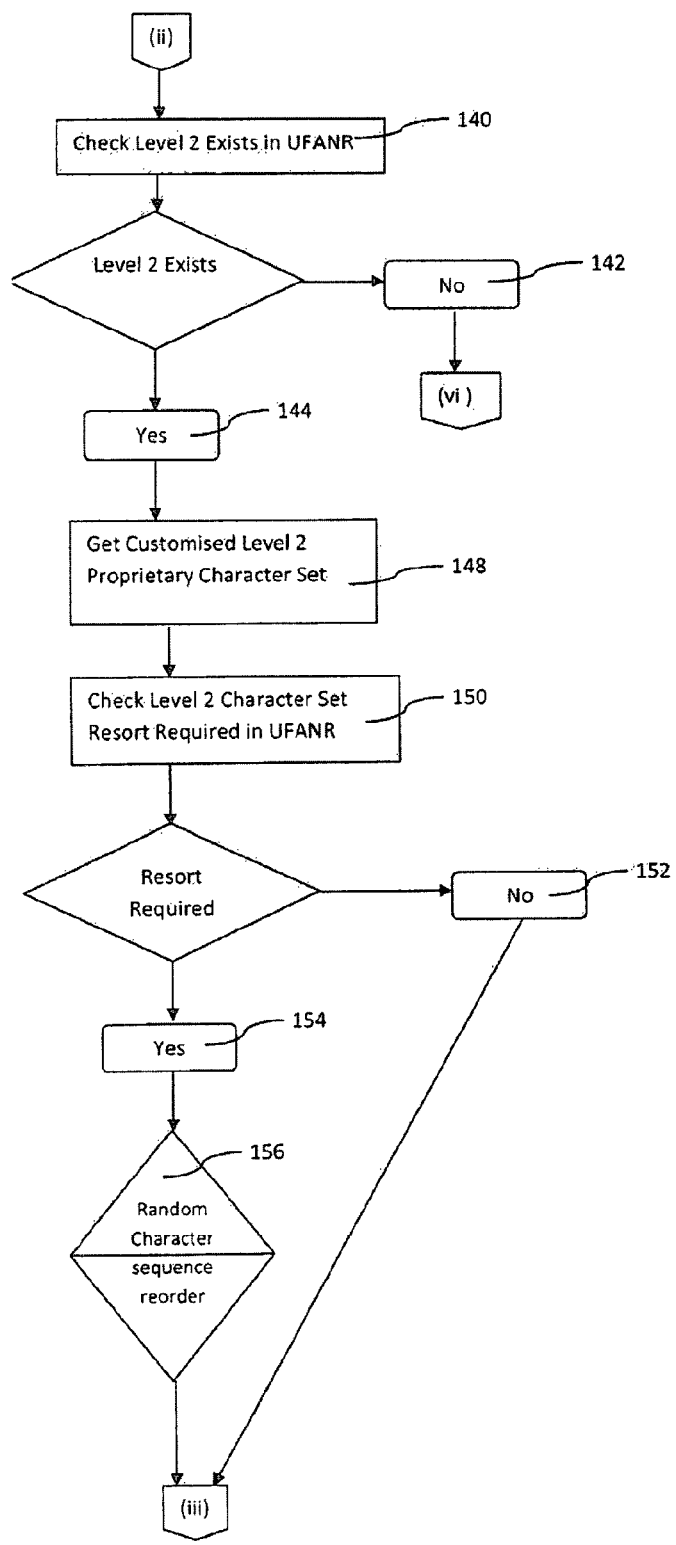
Figure 2C:
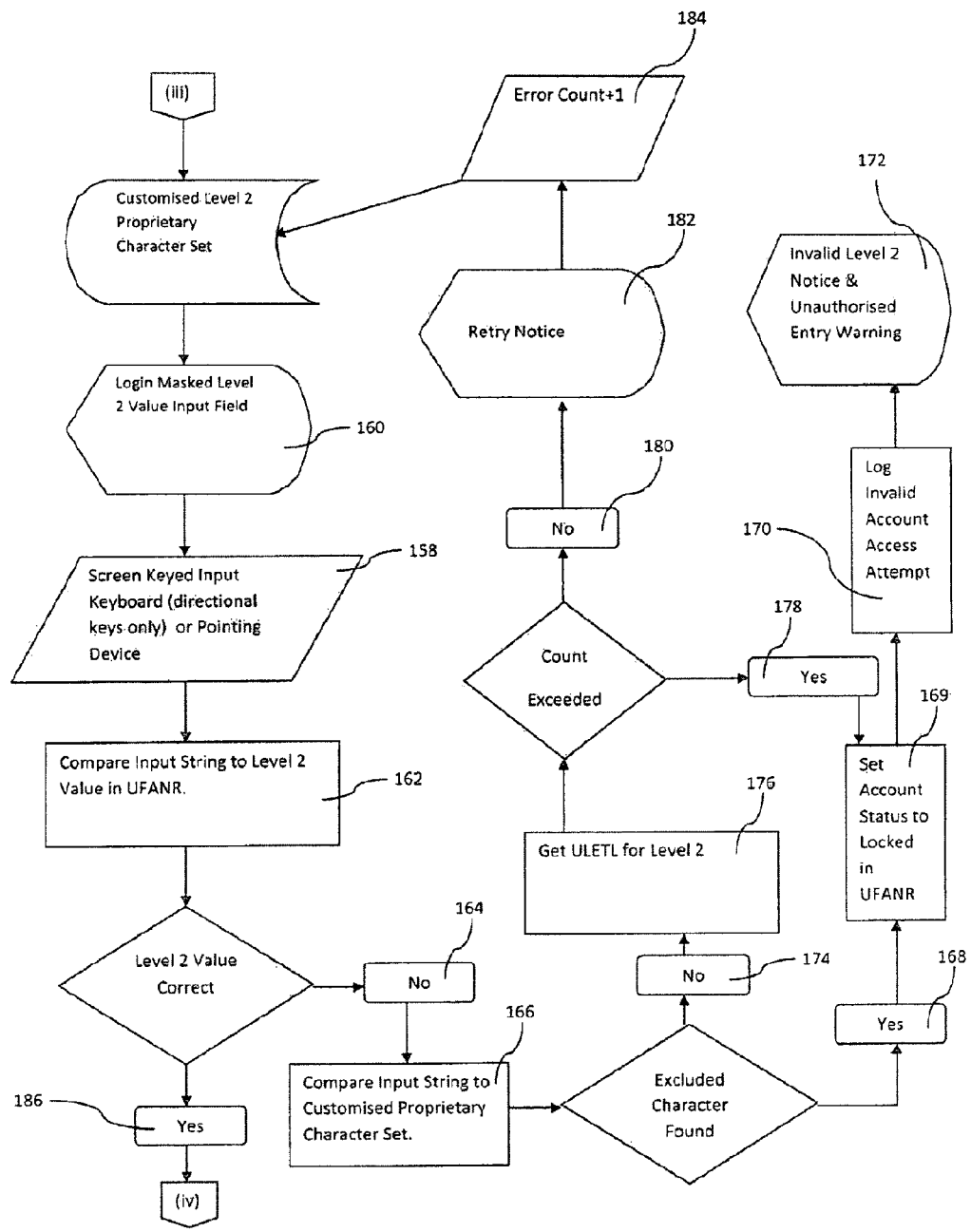
Figure 2D:
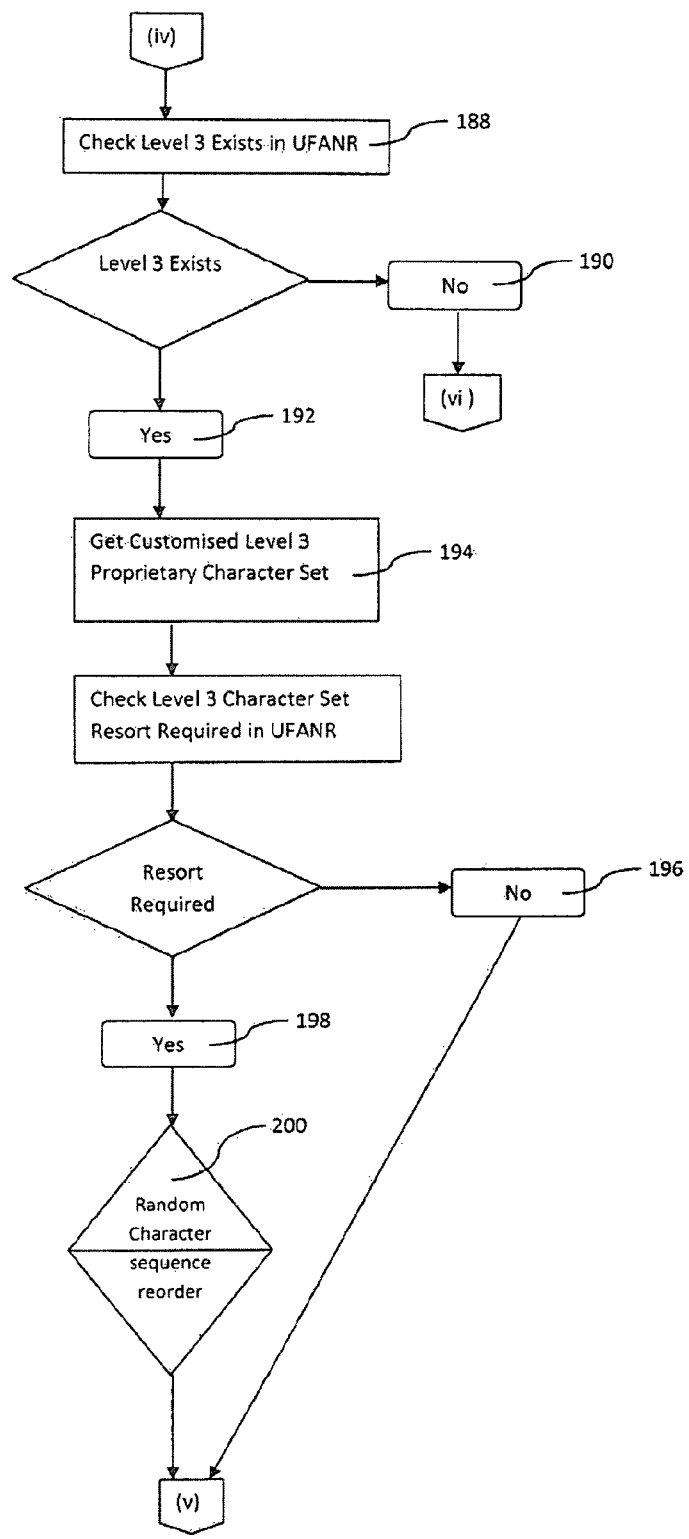
Figure 2E:
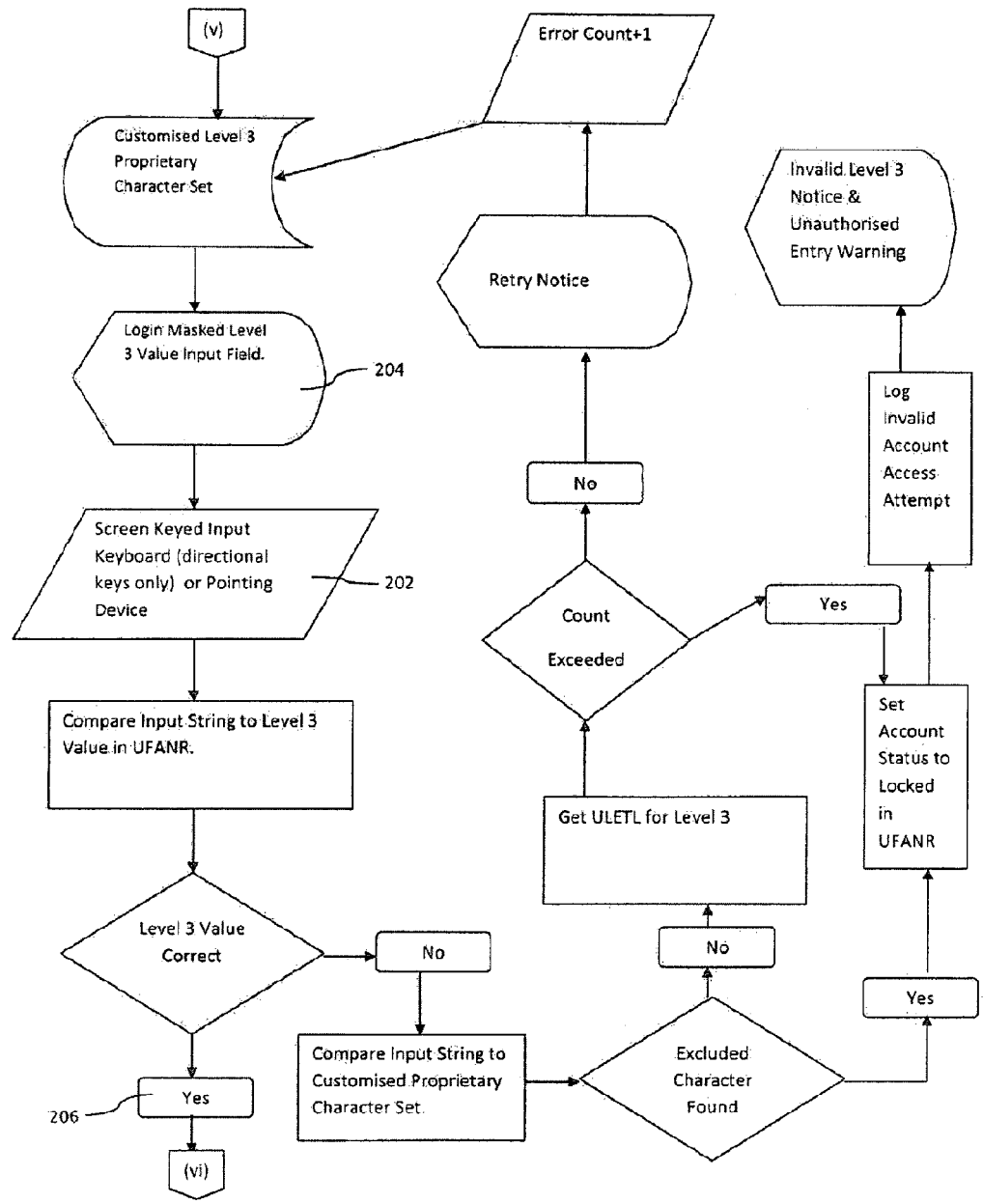
Figure 2F:
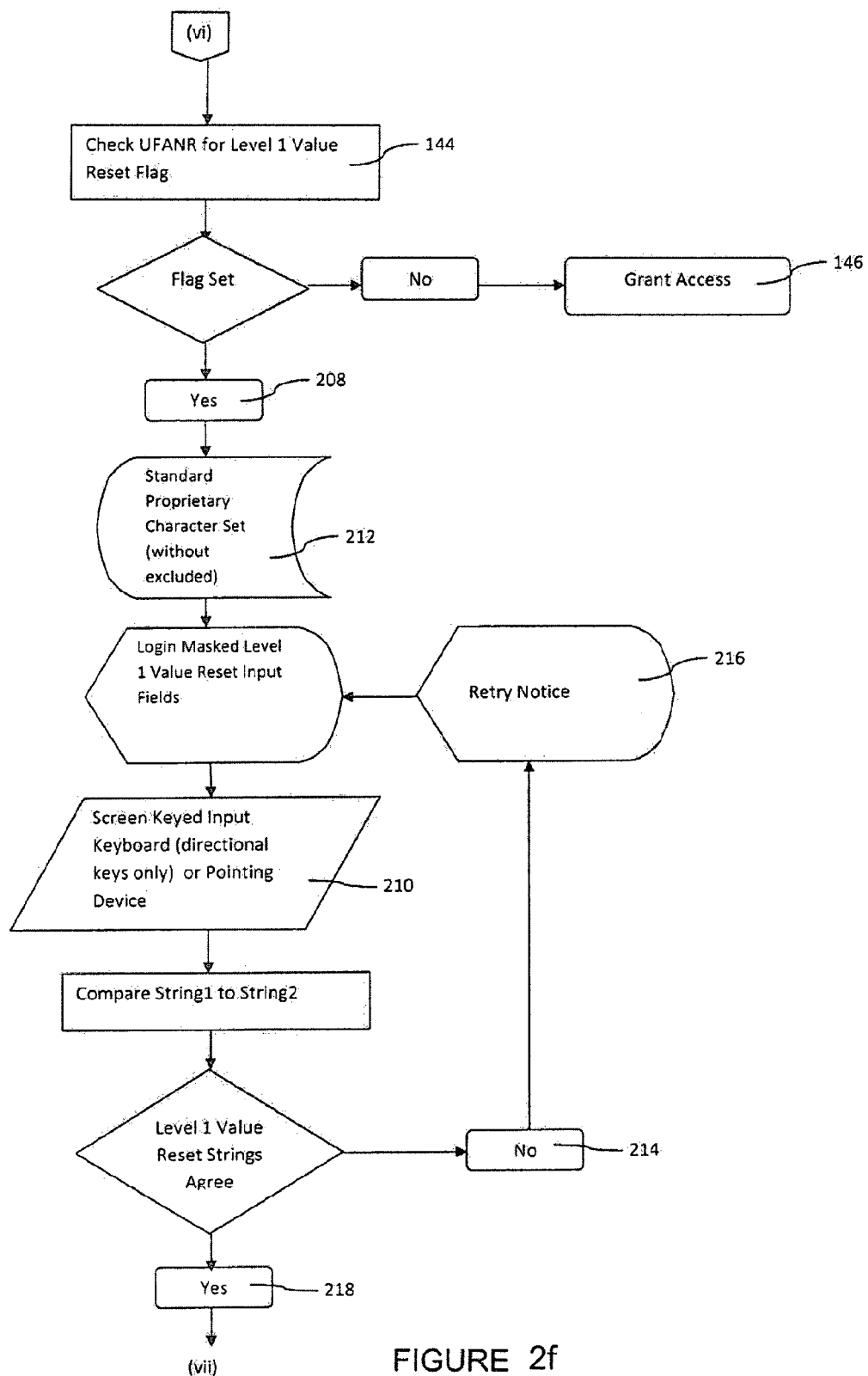
Figure 2G:
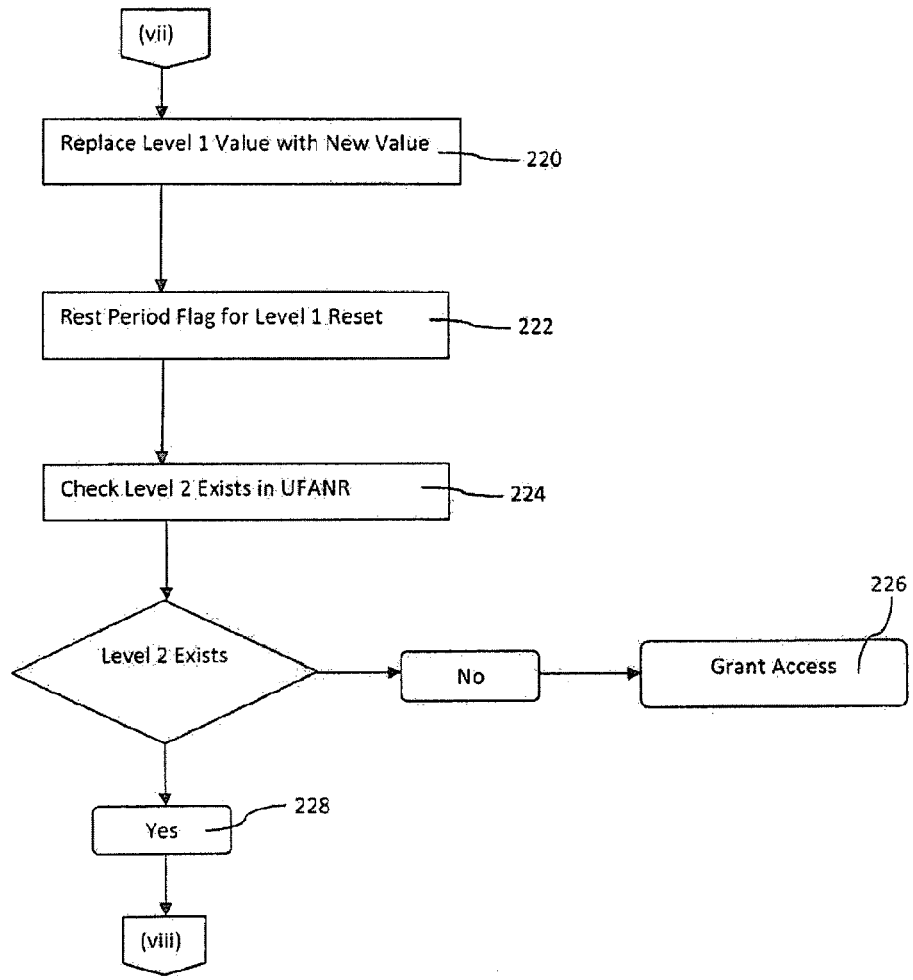
Figure 2H:
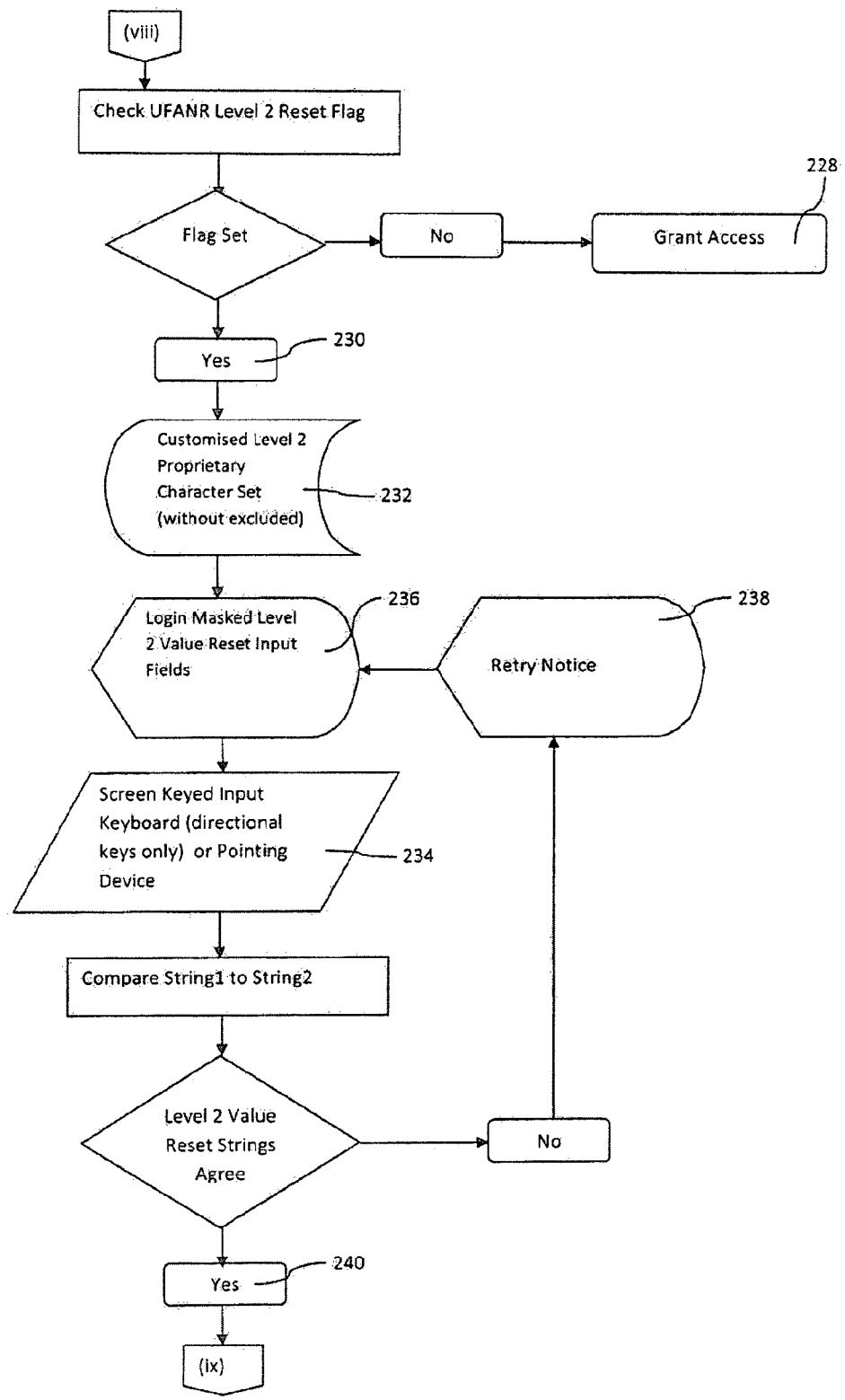
Figure 2I:
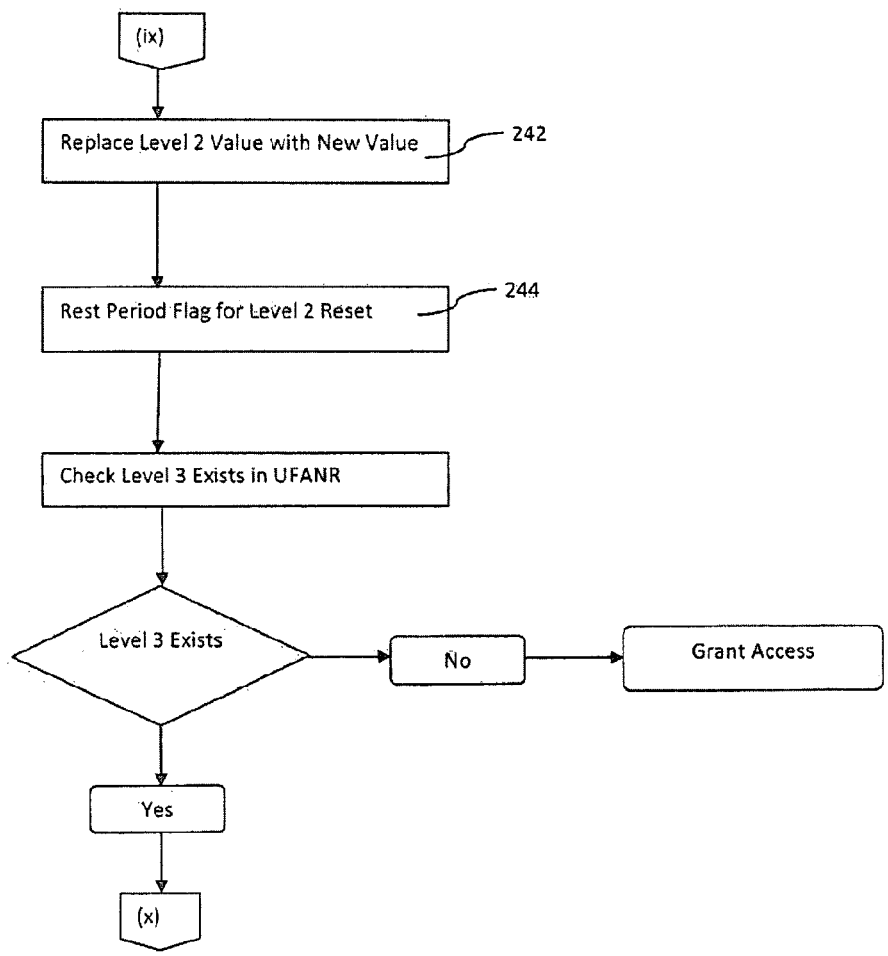
Figure 2J:
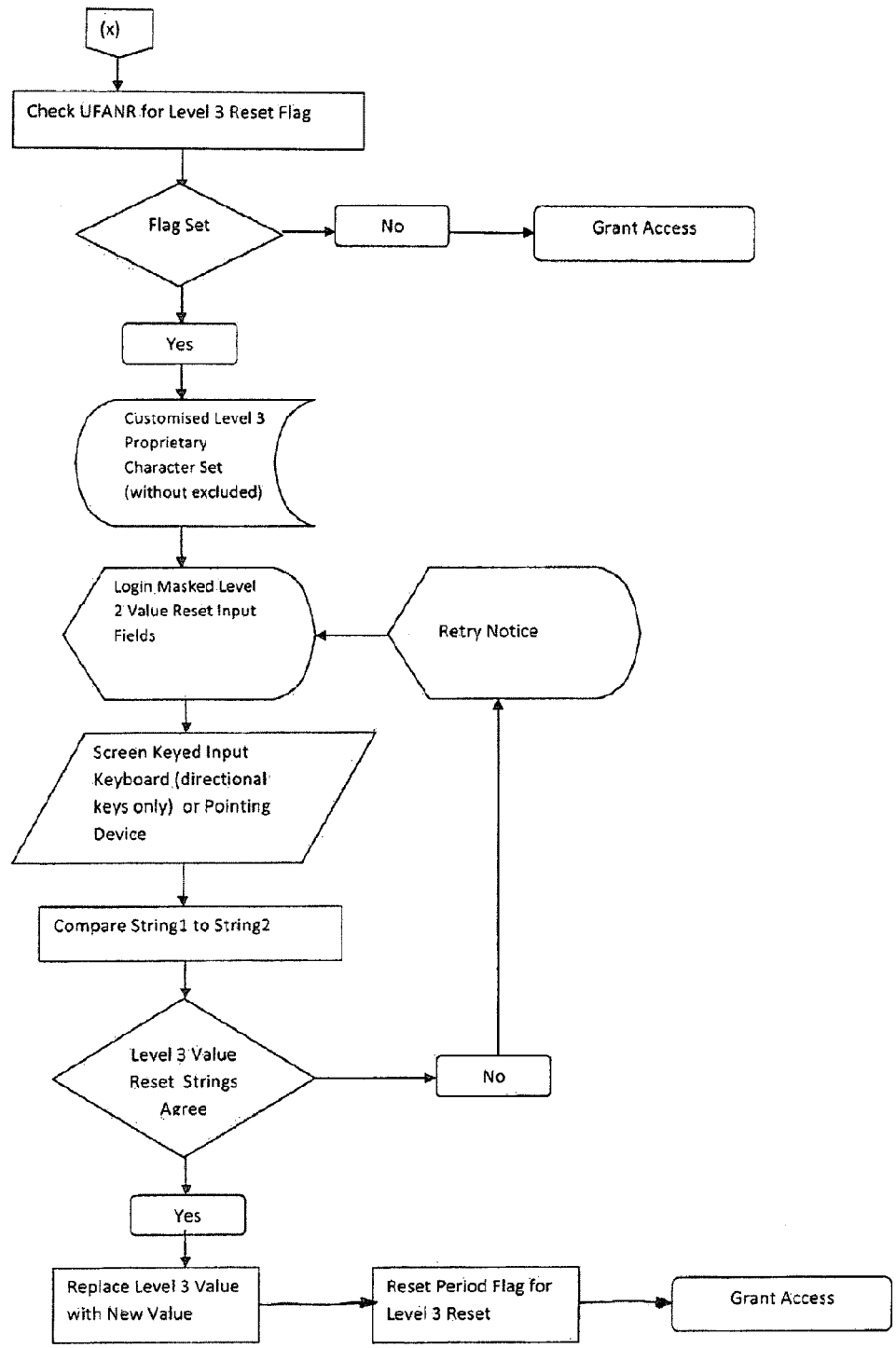

As shown in FIG. 1, a user 10 requests access to an account from an institution 11 via a network or application 12. This could be a global computer network such as the Internet. The user 10 may make the request through an electronic device having a visual display screen such as a cellular phone, PDA, blackberry, laptop, or personal computer 14, or any other device capable of accessing the relevant network or application 12. This could include terminals providing access to a network such as a global computer network like the Internet. The network may be a stand alone network, local area network, wide area network, Internet, cellular network, wireless or wired network. The present invention is not however limited to use only on a network, and may also be used to login to a software or web application for example. The term "network or application" is intended to be construed broadly by referring to any means by which a user 10 may wish to access an account using an electronic device having a visual display screen. A server/processor 16 including an input/output device 15 to allow communication, receives the access request from the user 10 and initiates the login process for the user 10 to enter his/her security identifier, for example a username, password, roaming code, PIN, etc. The server/processor 16 is connected, or incorporates, a database 17 for storing the security IDs, character sets etc. The server/processor 16 may be operated by the institution 11, or alternatively may be operated by a third party with the outcome then communicated to the institution 11. The server/processor 16 sends via the network 12 a login interface 20 to display on the user's 10 device 14, prompting the user 10 to input his/her security identifier ("security ID"). The user 10 then enters his/her security ID (as further described below) and the information is returned to the server/processor 16 for processing.

An exemplary method of implementing the access or login process, known to the applicant as Variable Proprietary Character Set Multi-layered Login (VPCSML), in accordance with one embodiment is illustrated in the flow chart of FIG. 2. The method may be implemented through a standalone software application, or integrated with existing access applications.

The user 10 accesses a website or application which they wish to access through a browser or other interface, and an entry screen appears on which an option to login can be selected. Once login has been selected, a request 100 is sent to the account administrator's server/processor 16. The server/processor 16 receives the request and sends a logon access interface 20 to display on the user's 10 device 14 visual display screen. The interface 20 displays a unique graphical display character set 102, being a custom set of characters that have been established by the administrator as a "keyboard" for the user 10 to enter his/her security ID value, for example a username, password, PIN, etc.

The number of security ID values required by a user will depend upon the institution, the account they are trying to access, and the level of security required. For example, for some logins only one security ID value may be required (eg a username), although typically at least two security ID values would be used (eg a username or account number and a password), and ideally at least three (eg a username, password and PIN). More than three may be used in some higher security situations. In the present embodiment, three security ID values are used, which are identified by Level 1 value (username), Level 2 value (password) and Level 3 value (PIN). It is noted that the terms username, password and PIN are used for illustrative purposes to aid understanding. They simply represent three levels of security ID codes and the code fields can be named whatever is required for system implementation purposes. A further level of protection may be gained if the administrator uses unique field code names, as any phisher will not know the types of codes to ask the user for.

Figure 4:
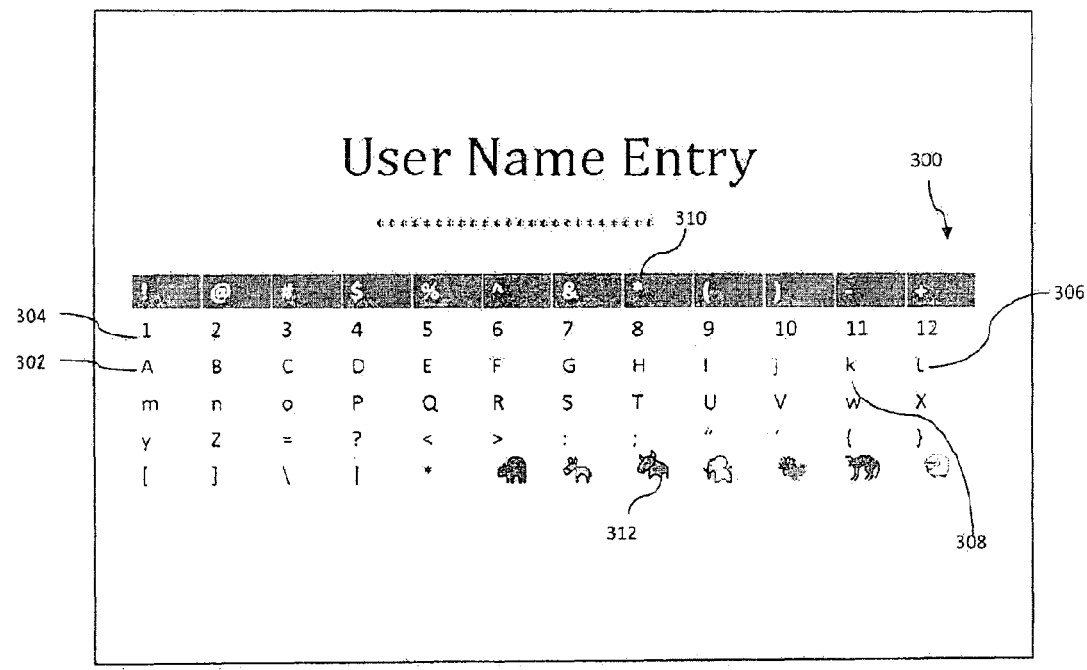
FIG. 4 is an exemplary Level 1 entry access interface and graphical display character set using the field name "username"
Figure 5:
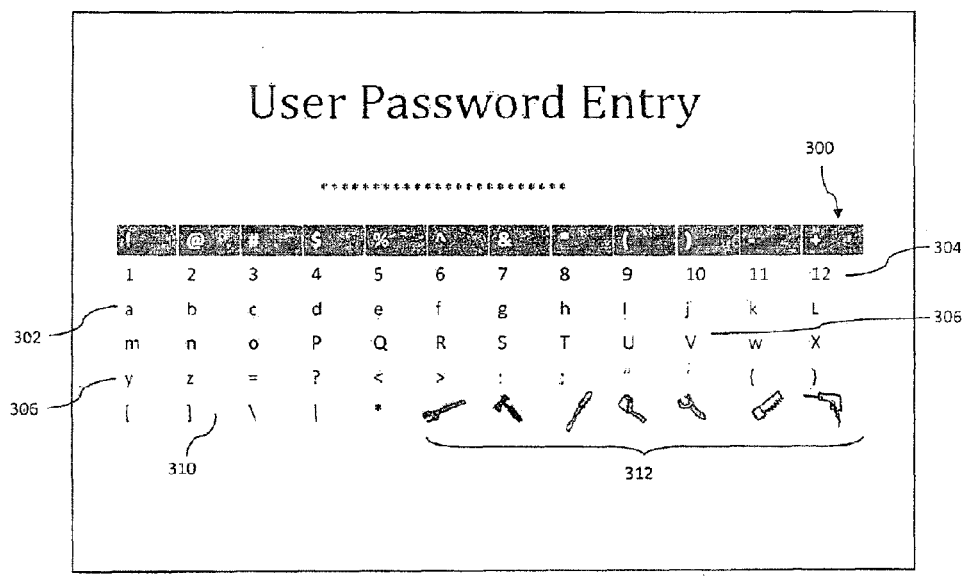
FIG. 5 is an exemplary Level 2 entry access interface and graphical display character set using the field name "password"
Figure 6:
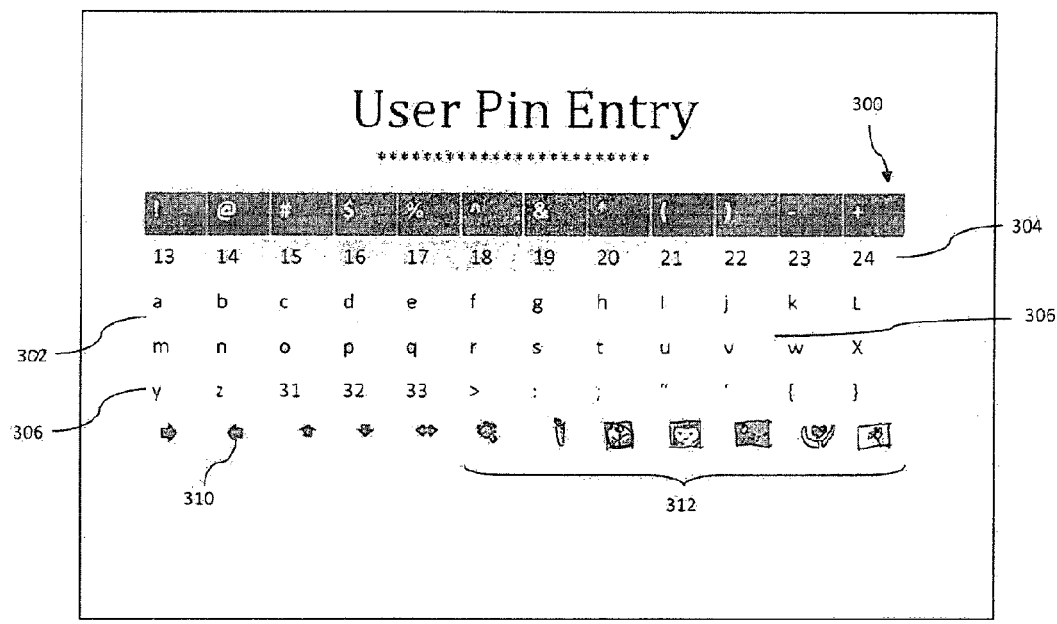
FIG. 6 is an exemplary Level 3 entry access interface and graphical display character set using the field name "PIN"

Exemplary graphical display character sets 300 ("GDCS") as displayed to the user 10 on the visual display screen of the device 14 are shown in FIGS. 4, 5 and 6, however any combinations and types of characters can be used depending on the capacity and sophistication of the technology platform used.

The GDCS 300 allows the user 10 to select a graphical representation of the characters forming the user's security ID on the visual display screen to enter the requisite value and thereby gain access to the user's account. The predetermined character set used for forming the GDCS 300 may include any form of characters or symbols, for example letters 302, numbers 304, upper case 306 and lower case 308, punctuation signs 310, and images/pictures 312 or different colours (not shown). All of these forms of characters/symbols are referred to solely as "characters" throughout the description and claims. Preferably each security ID will include at least one of each form of character for enhanced security (eg at least one number, image, letter, etc), hence the character set and GDCS 300 will include more than one of each of the character forms, although in other embodiments, characters may be just one form of character, eg all images or all alphanumeric characters. It is noted that not all characters in the predetermined character set may be displayed on the GDCS 300, as further described below. Rather, only a subset of all the institution's predetermined character set may be displayed for each log in.

A preferred embodiment may have an additional level of security by including some characters in the character set at least at Level 3 or greater that are not readily described to make it difficult for the user to be tricked into revealing such information verbally. Ideally a strict non disclosure policy for all codes should be enforced on a system and users should never be required to reveal their codes in any operating procedures.

It is preferred that the character set or sets is/are unique to the proprietary system/administrator and independent of other applications, further enhancing security by limiting knowledge of the underlying code to only those who create it and if encrypted preventing code breaking at binary level. One character set may be used for an entire institution, or for blocks of users by type or group, or for network subsets, or by host interface to make it harder for hackers to use off the shelf code that will not have been programmed to work with the customised character set. It facilitates the programmer to user stronger numeric combinations for each character, which may further deter attacks even at machine code level.

The order and location of the characters displayed to the user in the GDCS 300 may be randomised for each login, or even during login where a higher level of security is required in highly visible locations (for example in ATMs, to prevent skimming access to a user's PIN). The order for each character set level value could also be changed randomly to further deter progressive phishing attempts (eg first input password, then username, then PIN).

Once the user 10 receives the GDCS 300 on his/her display, the user 10 is prompted to enter his/her Level 1 value. The Level 1 value has preferably been previously set by the administrator and is known to the user, and is linked to a fixed user account name known only to the administrator. Alternatively, the user may click through a link on the login screen or telephone a customer service agent to obtain a Level 1 value for the system.

The fixed user name is ideally never revealed to the user and is used for security tracking only. The administrator can optionally change all user code fields as required or on a periodical basis without the need to establish a new account while still maintaining security. If an account is compromised then the administrator can simply issue new credentials without having to re-link or transfer database information or having to create a new set of user access rights.

Figure 10:
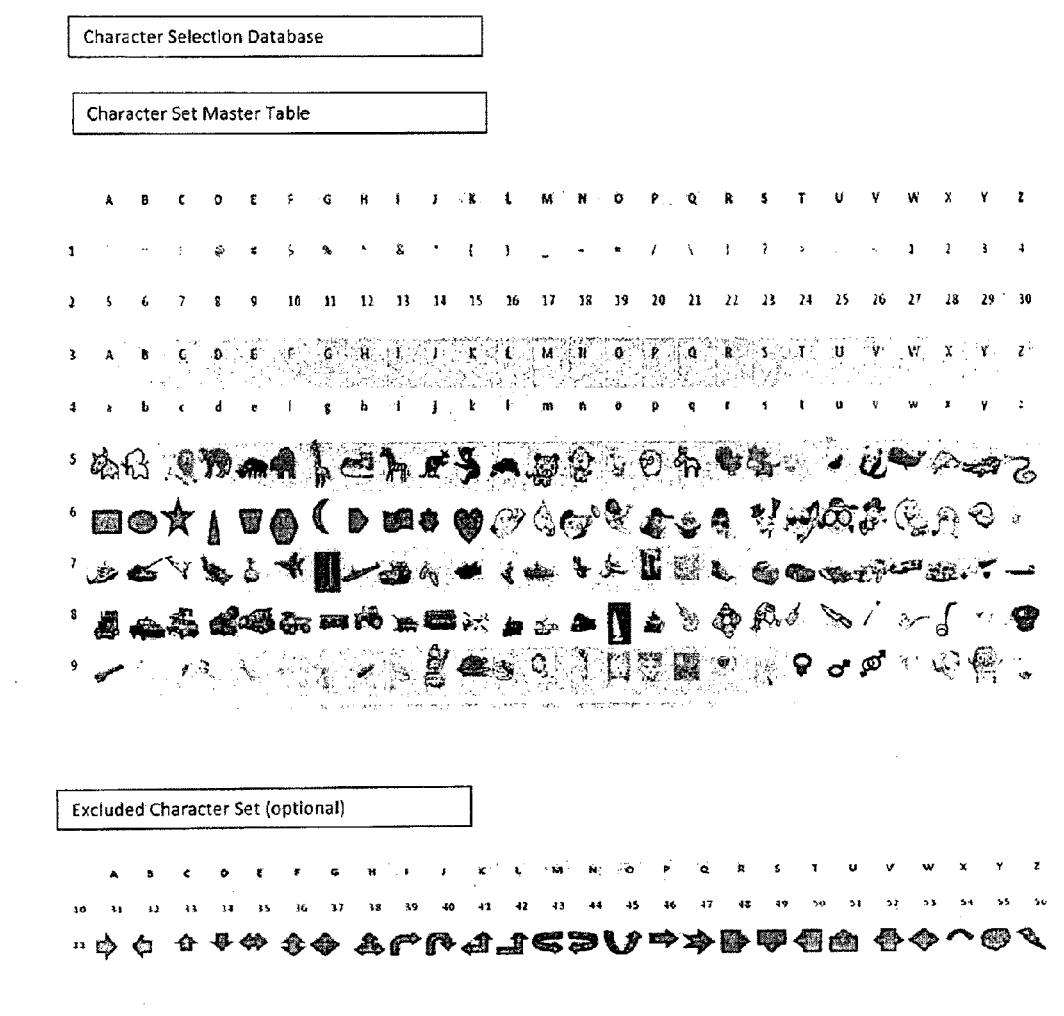

As noted above, the Level 1 value is set to incorporate characters from a predetermined character set, for example the set shown in FIG. 10 or FIG. 11, for the group of users for that set. In this way, the administrator can setup groups of users on separate login sites to limit the impact of denial of service attacks by decentralising the login interfaces. The Level 1 value may be basic, ie just a name "John Smith" or a number "1234", with no real security, and may consist entirely of alpha numeric characters. To increase security however, the username preferably includes at least some of the above mentioned special characters such as images or punctuation marks.

It is noted that the GDCS 300 does not necessarily include every character from the institution's predetermined character set. Rather, only a subset of available characters may be displayed to the user. In some forms, the subset displayed is random, and may change for each login attempt. It is also noted that the location and ordering characters in the GDCS may change for each login attempt, and in some forms may even change after the user selects each character.

The master predetermined character sets in FIG. 10 and FIG. 11 are provided for assistance with understanding, however any combination and quantities of characters or pictures can be used and selection may occur from multiple databases of varying types with associated subroutines to further control the selection of characters for each character set. Depending on the level of code the subroutine may restrict character selection to, for example, the numbers only grid. Other selection criteria and tables may be incorporated for particular user group profiles to assist in providing graphic images that are more relevant and memorable to that set of users. On some security levels a user may select a password/username etc based on a simpler selection of characters (eg alpha numeric characters only), if there are regular password resets or a long password is required. In some cases where a password reset is used often, use of image characters as opposed to alpha numeric characters only may not be preferable as the user will find it difficult to remember continual changes in graphics based characters. If non-alphanumeric characters are required for a specific security level, this can be marked appropriately in the administrative settings database, see for example the column in FIG. 9 headed "Number of Required Characters".

To enter the security ID values, the user 10 preferably uses a device that is pointer driven or touch screen, rather than a traditional keyboard, to prevent keyboard logger programs working. However, the interface can be programmed to use a keyboard cursor, tab and return key for simple selection of the graphical keys. This would facilitate retrofit to existing devices and use by more basic PDA devices providing graphical standards can be supported. If input is by keyboard cursor, tab and return keys and not by pointing device, or is a combination of keyboard keys and pointing device, this will make it more difficult for shoulder browsers or covert surveillance to determine exactly what has been entered. The ideal scenario will be a combination of both but the level of complexity acceptable for the administrators and customers will determine to what extent this will be possible.

Alternatively, input keys on existing devices may be utilised, for example, data entry buttons on an ATM may be configured to allow a user to select a graphical character displayed on the screen.

An alternative is to have one security ID value entered by selecting the representative key on a traditional keyboard (eg the username), with a secondary and/or tertiary security ID value (eg a password) entered using the presently described graphical system.

Figure 12:
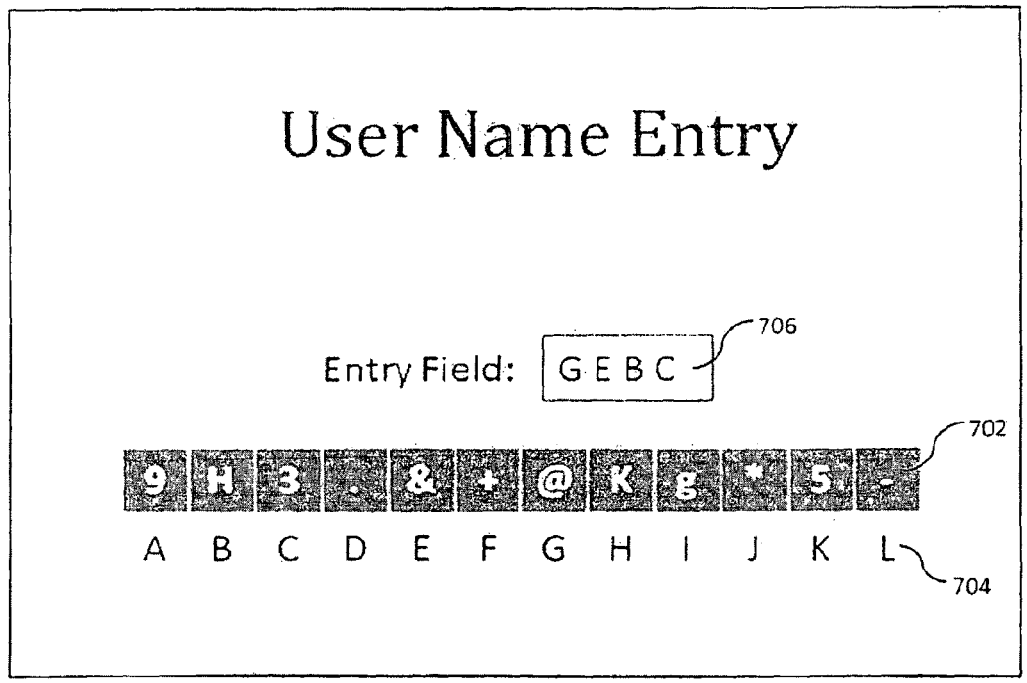
FIG. 12 is an exemplary security ID access interface in another embodiment where traditional keyboard characters are used.

A further alternative is shown in FIG. 12, which uses keys on a traditional keyboard which represent the order of the characters displayed on the GDCS 300. For example, if the security ID consists of four characters "@&H3" and the GDCS 300 shows 10 characters in the order 9H3.&+@Kg* (as indicated by reference 702), then the order of those characters may be represented by the keys "ABCDEFGHIJ" on a traditional keyboard (as indicated by reference 704). To input the security ID value, the user may select the required characters by choosing keyboard keys corresponding to the order of those required characters shown on the screen, ie in the present example "GEBC" 706. In this way, the actual keys are not representative of the security ID, and the order of the character set may vary for each log in attempt to overcome keyloggers and skimmers.

For strengthened security in situations where possible visual identification is an issue, the security ID values may be masked 106 to further reduce possibility of breach by visual observation or monitoring, and/or optionally encrypted if system resources allow.

For further security, the security ID values can be linked to a logon machine identity using MAC address, IP or FQDN for users with a static IP or FQDN. This would be managed depending on type of account. For domestic this could be MAC address and user may be required to resubmit request for access details for each machine used. For corporate it can be controlled on the basis of individual static IP addresses or an entire subnet etc or FQDN.

Figure 8:
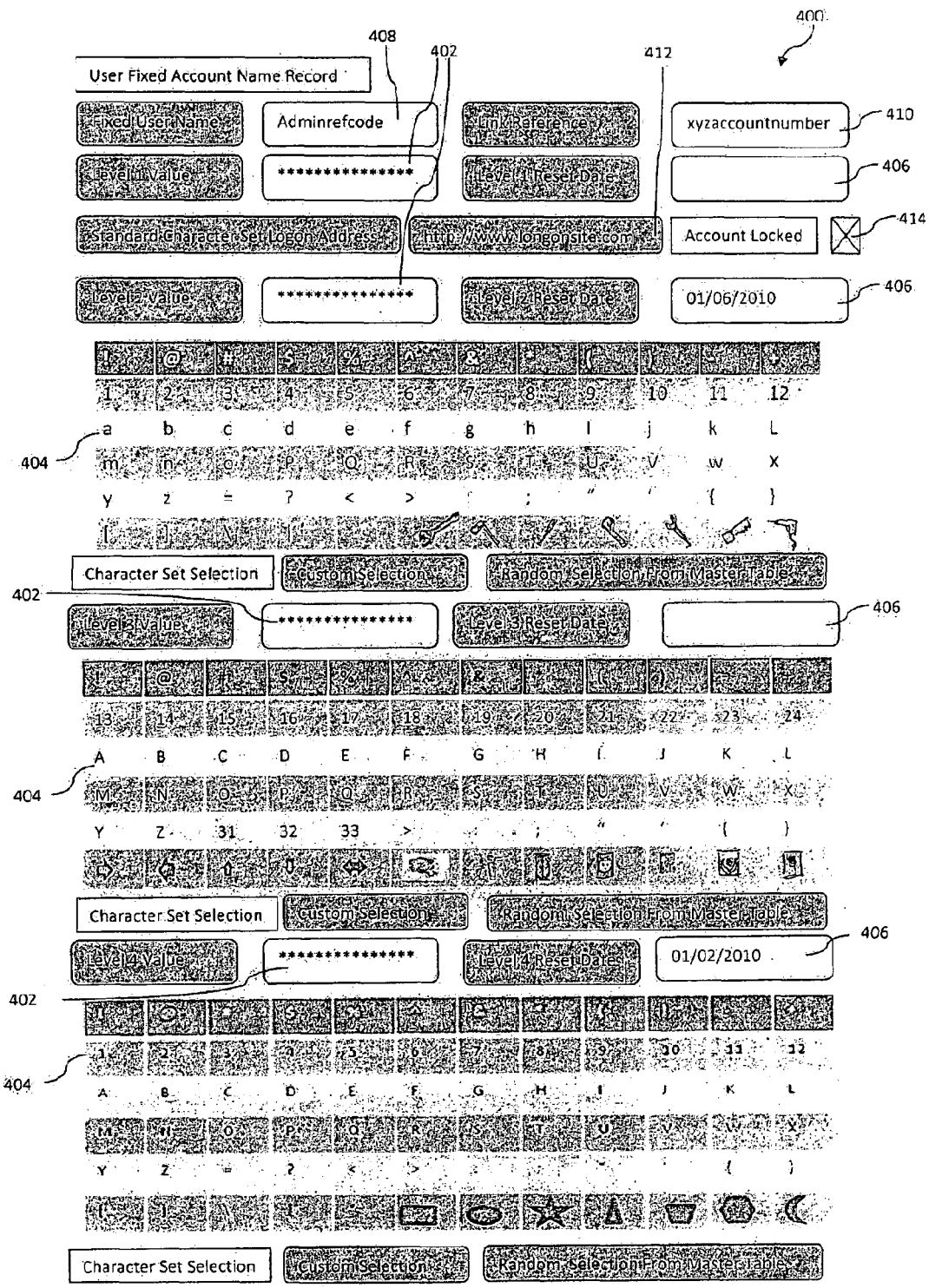
FIG. 8 is an exemplary administrator database table for security ID settings of a particular user.

Once the user 10 has inputted the designated Level 1 value 108, the value entered by the user is compared to the Level 1 value stored in the User Fixed Account Name Record (UFANR) administrator database 110. An exemplary UFANR database table is illustrated in FIG. 8.

The UFANR database 400 includes the users' security ID values 402 and predetermined character sets 404 for each value 402, the date the security ID values 402 are to be reset 406 if applicable, the fixed user name 408 and reference number 410, the account logon address 412 and a field to indicate whether the account is locked or unlocked 414.

If the user entered Level 1 value is not found 112 in the UFANR database, the user entry is checked for any excluded characters 114. Excluded characters are all character combinations outside the allowed character set, and may be a single character or multiple characters. It may be desired for higher security applications to introduce a set of excluded characters to identify a possible hacking attack for immediate lockout, as shown in FIGS. 10 and 11. The excluded character set may include a subset of characters in the same predetermined character set as for the particular user (shown in FIG. 11). Alternatively, the excluded character set may be a separately defined set or table of characters (shown in FIG. 10). Preferably though there should be no overlap between required characters and excluded characters to avoid unexpected outcomes. If excluded characters are found 116 in the user entry, a log entry is generated for an invalid account access attempt 118 using excluded characters and an invalid account and unauthorised entry warning notice is displayed to the user 120. The user may then be requested to re-enter the Level 1 value, or alternatively to contact the administrator. The IP address from where the user accessed the login site may also be blocked from further login attempts.

Excluded characters would generally not be used in the character set at Level 1 as this may result in intentional disruption to account use by malicious hackers guessing valid Level 1 values randomly (however as noted immediately above in some high end applications this may be desired). However, invalid entries will result in a lockout notice as this suggests a password guesser is being used and not the onscreen keyboard. Further, the system allows optionally for multiple time out resets (the number determined by the administrator) at a Level 2 to reduce the possibility of the user being inconvenienced if a random hacking attack reveals the Level 1 value and then locks out the account by attempting to guess the next level. The system allows for a maximum of resets to be set beyond which the normal account lockout is set as if this point is reached it would indicate the account is under attack. This strategy could of course also be adopted for lower levels however it would effectively lower the security level of the system and would not be recommended.

Figure 9:
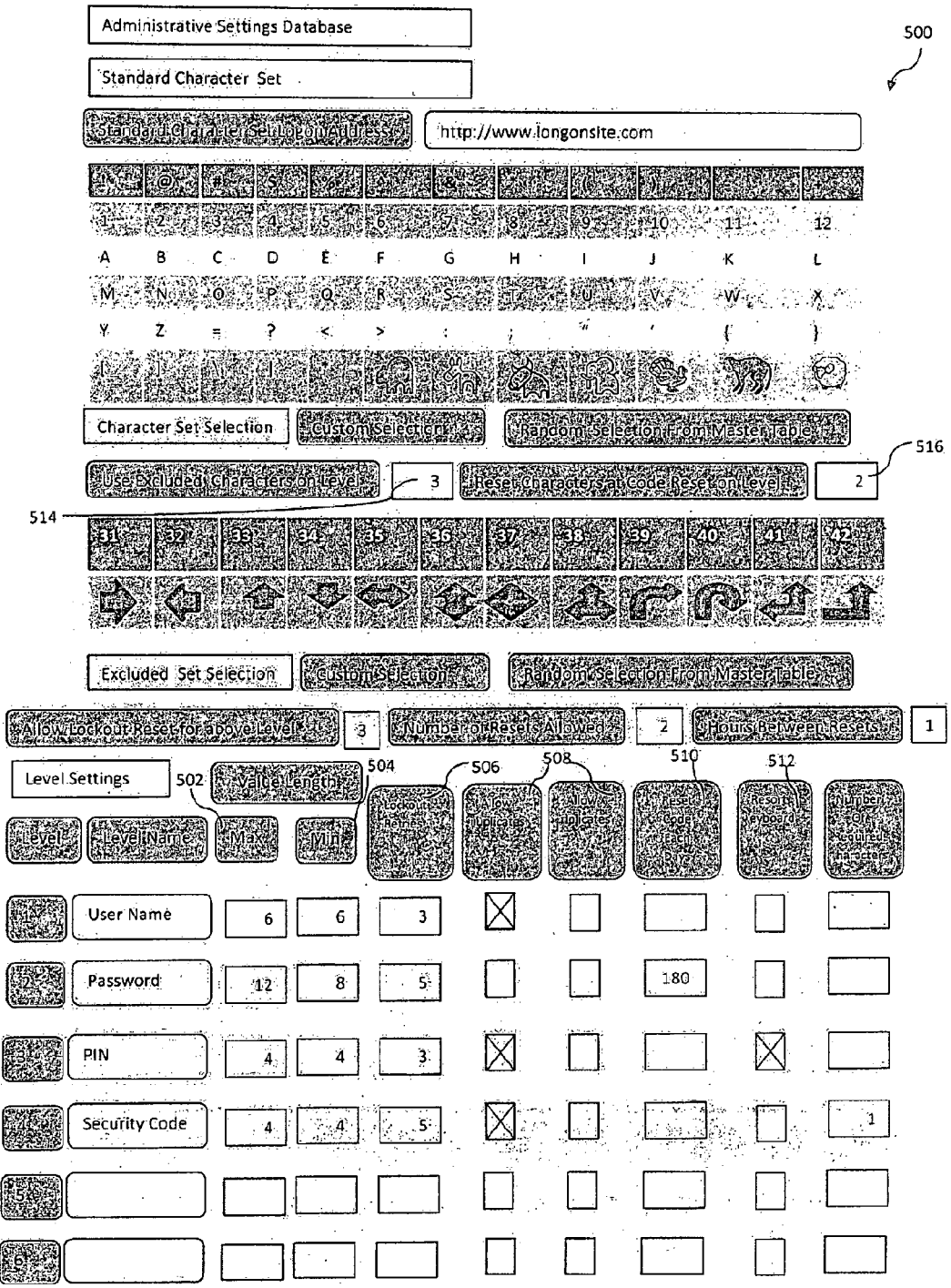
FIG. 9 is an exemplary administrator database table for logon settings for a particular user.

If no excluded characters are found in the user entry 122, the number of retries is checked in the User Login Error Tolerance Level Count database (ULETL) 124; an exemplary ULETL database table is illustrated in FIG. 9.

The ULETL database 500 optionally includes a maximum 502 and minimum 504 character length for each security ID level, the number of retries allowed for each security ID level before account lockout 506, whether or not duplicates and/or triplicates of characters may be used in the security ID values 508, the period when the security ID value must be reset 510, whether it is necessary to re-sort the GDCS for random placement and order of the display 512, an account lockout reset 514, and a character reset at code reset 516.

An account lockout 514 reset can be employed to prevent the user from being inconvenienced if an attempt to access the site has been made by an unauthorised party, for example a hacker locates the site and attempts to guess a valid user code. The reset is set to enable the administrator to allow another or multiple attempts after a predetermined period of time has elapsed.

A character reset 516 can be forced optionally at time of code reset to make it even more difficult for phishers to accumulate the necessary combination of information to fool a user into revealing their credentials over time to gain access to an account.

If the retry count listed in the ULETL is exceeded 126 by the user entry, a log entry is generated for an invalid account access attempt 118 using incorrect valid characters and an invalid Level 1 & unauthorised entry warning notice is displayed to the user 120. The account lock out policy is set dependent on the user logon error tolerance level policies. As the character set is unique to the user 10 and only known to the user and the institution, a greater level of tolerance can be set as required. For example, tolerance may be set at 10 retries if 85% of the security ID is correct, or 3 retries before lockout if less than 85% correct, or immediate lock out if an excluded character is used.

It is noted that at Level 1 an actual lockout cannot occur from a hacking attempt unless there is a field match ie the hacker correctly guesses a valid value for Level 1 and then subsequently enters an invalid entry at the next level. Consequently, an additional time based lockout reset may optionally be allowed to occur if, for example, public access is available to the interface (eg the internet). This is to prevent the user from being inconvenienced by a random hacking attempt. One of the strengths of this system over existing systems is allowing for account lockouts while at the same time minimizing administrative duties associated with such lockouts.

If the user entered Level 1 value is not found in the UFANR 112, and no excluded characters have been entered 122, and ULETL count is not exceeded 126, then a retry notice is displayed to the user 128 and the ULETL user entry count is advanced by one 130. The user can then re-input his/her Level 1 value and the validating process as described above is repeated.

If the Level 1 value is found in UFANR 132, the account lockout flag is checked in the UFANR 134. The account lockout flag may be set if the administrator has concerns over the security of the login, or the customer has requested the account is disabled, or for any other reason. If the account lockout flag is set to lockout an account, a lockout notice is displayed to the user 138.

If the user entered Level 1 value is found in UFANR 132 and the account lockout flag is not set 138 then the system determines whether there is a Level 2 security ID value in the administrative settings UFANR database 140. A Level 2 value is a further layer of security, and may for example be named a password. If there is no Level 2 value 142 then after a reset flag check 144 (described further below), the user is granted access to the system 146 and the login process is terminated.

If there is a Level 2 value established in the database 144, then a customised Level 2 interface is displayed to the user on the visual display screen on the user's device 14. The Level 2 interface displays a Level 2 graphical display character set established for the user 148. An exemplary interface and GDCS is shown in FIG. 5, although again any combinations and types of characters or icons can be used in the character set depending on the capacity and sophistication of the technology platform used. The Level 2 GDCS may be identical to the Level 1 GDCS, although preferably a different character set is used as an additional security measure.

The Level 2 GDCS may be arranged for display in a different order if the "resort" flag has been set in the administrative settings database, as shown in FIG. 9. The change in order may be undertaken after each login attempt, or after each character is entered by the user for enhanced security.

Once the Level 2 GDCS is displayed to the user, the user selects the required characters to enter the user's designated Level 2 value 158, in the same manner described above in relation to the Level 1 value. The Level 2 value may have been previously set by the administrator or the user at account establishment, or on periodical or random reset. The entry field is preferably masked 160 so that user entries cannot be seen.

The Level 2 value entered by the user is then compared to the Level 2 value stored in the UFANR 162. An identical process to the Level 1 value is then undertaken to check for excluded characters, number of retries and account lockout. If the conditions are satisfied but the Level 2 value is incorrect, then the user may be prompted to re-enter the Level 2 value. Alternatively, to increase security the user may instead be returned to the Level 1 value interface to re-enter the Level 1 value.

If the conditions described above in relation to the Level 2 value are satisfied, then the UFANR database is checked for a Level 3 security ID value 188. In the present embodiment, the Level 3 value is named a PIN, although other security ID types could be used instead. If there is no Level 3 value 190 then after a security ID reset flag check (further described below), the user is granted access to the system 146 and the login process is completed.

If a Level 3 value is established in the database 192, a customised Level 3 interface is displayed to the user with the Level 3 GDCS 194; an example interface and GDCS is shown in FIG. 6 although again any combinations and types of characters or icons can be used depending on the capacity and sophistication of the technology platform used.

The Level 3 GDSC may be re-sorted for display if the re-sort flag has been set in the administrative settings database 200. The user inputs the designated Level 3 value by selecting the displayed characters as described above. The Level 3 value may have been previously set at account establishment, or on periodical or random reset. The user entry field is masked so that user entries cannot be seen 204.

The Level 3 value entered by the user is then compared to the Level 3 value stored in UFANR 206 in the same manner as the Level 1 and Level 2 values above.

If, after the requisite checks, the Level 3 value is found in UFANR 206, then the Level 1 Reset Flag is checked in UFANR 144.

The security ID values can be optionally set as variable (ie the Reset Flag is checked) and linked to a user fixed account name database that is secure and known to site administrators only and not to users. This enables a security ID to be readily changed as determined by security policy which may include allowing or forcing the user to periodically change the value. This reduces user database administration costs and will keep full log of problem users for whom higher levels of restriction or lockout can be maintained as set by network policy.

Figure 7:
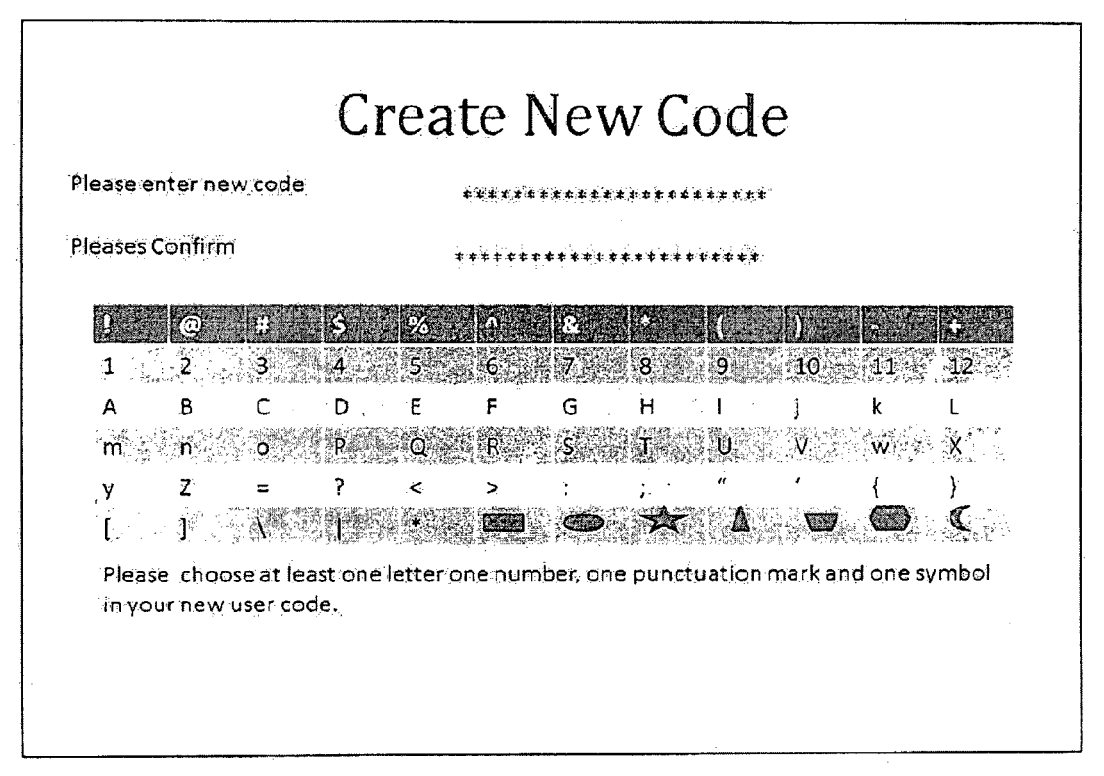

Accordingly, if the Level 1 Reset Flag is set 208 an interface is displayed to the user with the custom set of graphical characters that have been established by the administrator for the user's Level 1 value; a sample interface is shown in FIG. 7. The user inputs a new Level 1 value 210 and reconfirms the value in a second field. The fields are masked so that user entries cannot be seen 212. If the first and second fields do not match 214 the user is prompted to re-enter their choice 216. If the fields match 218 confirming desired new Level 1 value, the Level 1 value is updated in UFANR 220 and the Level 1 Reset Period in UFANR is reset 222.

The UFANR is then checked for a Level 2 Reset Flag 224. If a Level 2 Reset Flag is not checked then same process is then undertaken for a Level 3 Reset Flag. Once the reset process has been completed, or the flags are not set, then the user is granted access to the account.

Preferably, the new security ID will need to be different to any past security IDs. The new security IDs may be set by the administrator, or set by the user, or in some cases randomly generated.

In some forms, there may include multiple screens within the existing logon screen. This may allow each level entry input to be shown on the screen simultaneously. In this case, the system may require all the field entries to be entered prior to submission and comparison by the system.

Figure 3:
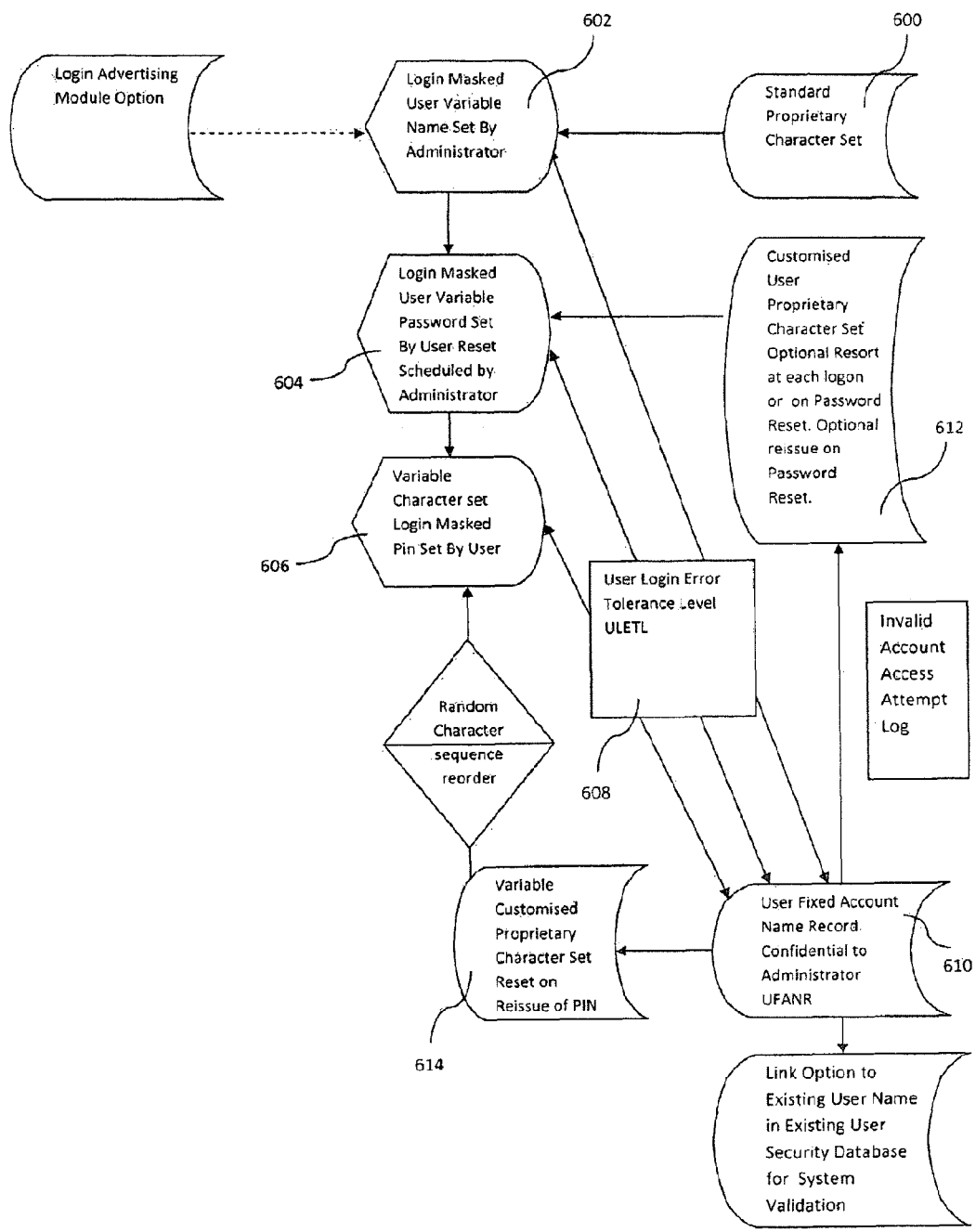
FIG. 3 is a summary overview of a set up process for implementing the method of FIG. 2.

FIG. 3 shows a summary overview of the set up process for implementing the method described above. The character set for the user is determined by the administrator 600. The Level 1 value (username) is set by the administrator 602 from the predetermined character set 600. The Level 2 value (password) is then set by the user from the predetermined character set 600, and scheduled by the administrator for periodic reset 604. The Level 3 value (PIN) is then also set by the user 606 from the predetermined character set 600.

The administrator can add additional levels of security by adding additional security ID levels in the UFANR. In this example, the presently described system is set for 3 levels—one Username, one Password, and one PIN, although more than three levels may be used in other embodiments. In the present embodiment, both the Password and PIN are set and changed by user, however it is recommended if the user is allowed to change the PIN that another level of PIN or code is introduced that can only be changed at administrator level to prevent identity theft.

The login error/retry level is set by the administrator depending upon the security constraints and policy 608. The administrator links the security IDs to a user fixed account name record which is confidential to the administrator 610. The values and timings for the re-ordering 612 and security ID reset 614 options are determined by the administrator. All the values are stored in the administrator settings database(s).

In the case that an account lock out occurs and the user is identified as a legitimate user of the account, then new security ID values may be issued to the user by the administrator. The new values will preferably consist of a new character set for each additional level deployed with the exception of the lowest level code. The user PIN in this example, or the lowest level of entry security ID deployed as a minimum, should not be allowed to be reset by the user to prevent identity theft. The lowest level key once issued is ideally never changed. If this security ID was required to be changed then at this point a new user account would need to be created and accounts established to check the actual identity of the person seeking to operate the account. If it is necessary to allow security ID changes at a level then another security ID level should be activated to prevent identity theft. The term variable is used to indicate the field can be changed but not that it should be allowed to be changed; this is a matter to be determined at an administrative level.

An optional password filler script may be used to validate the user on an existing systems security user database if this interface is to be added to an existing security database rather than implementing as part of a revised security structure. The required system password and username would be stored in the fixed user database and then retrieved and provided to the traditional user name and password interface required by most routers, network systems and computer operating systems. This would enable this system to be retrofitted to existing legacy systems.

The access interface can also receive advertising displays as optional revenue stream for developer to assist with system funding. This system could also be used simply to provide one or two additional graphical characters to add to traditional keyboard input verification model to add a further layer of security to password and or user name that cannot be generated without customised software for the interface. It also can be a further level of security for a digital certificate interface and could be controlled by that custom interface on user device with supply of digital certificate and updated or changed when certificate is periodically reissued or updated to change passwords. Logon can be set for both local and remote access using common or independent interfaces.

Phishing scams will be defeated for high end uses such as banking by the use of a customised graphical key character set unique for each customer that is linked to their fixed account name and will only be presented to them at logon. In this way if the customer is tricked in to going to an invalid site it will not have the necessary custom character set to enable the client to input their password. In the event that the phisher was to access a lower level keyboard it will be customised and any phishing attempt will have to replicate this customised keyboard to each user causing a great deal of effort to be undertaken by the phisher just to reveal one level. They would then have to trick the user again for each subsequent level and entice them back to another site to secure the next level making it very difficult to trick a user into revealing their information. If very high levels of security are required optional periodical code resets are also used and the keyboard is changed at time of code reset at one level or more and the intervening periods of time are short then even this approach will be very difficult to implement by a phisher as they would need to get the user to reveal all codes for all levels in multiple attacks online before a key code change occurs in order to secure access.

Key logging will also be defeated by failing to use known keyboard layouts, and in particular standard keyboards, to enter security IDs. Furthermore, even if key strokes are captured the value of the selected character will be unknown to a third party, and if the character layout is varied for each login, will be very difficult for a third party to log or guess.

Password guessers will also be defeated by failing to include standard alphabet and numerical characters in a security ID, and furthermore by using characters proprietary to an administrator/institution will make the guessing a password very difficult.

The present invention could be combined with existing security systems, for example SiteKey web based security authentication system to provide enhances security for users. Similarly, the present invention could be combined with other security initiatives such as systems which send messages or verification numbers to a user's mobile phone to verify the identity of a user.

In the present specification and claims, the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

The foregoing discussion is considered as illustrative only of the principles of the invention. Furthermore, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A method for providing access to a user account via an electronic device having a visual display screen, the method including the steps of:

issuing at least one security identifier to the user, said security identifier including one or more characters chosen from a predetermined character set, and said predetermined character set being independent of said electronic device and unique to a subset of users;

providing an access interface on said visual display screen for said user to input said security identifier, wherein said access interface includes a graphical display character set which includes at least the characters comprising the security identifier, the graphical display character set being arranged such that each displayed character is associated with a particular location on the visual display screen, the graphical display character set being independent of said electronic device;

the association between a particular location on the visual display screen and a displayed character being based on a display sequence determined independent of said electronic device, and wherein said graphical display character set and said predetermined character set include at least one common character;

determining one or more visual display screen locations selected by the user, the one or more visual display screen locations corresponding to characters on the graphical display character set;

determining an entered security identifier based on the graphical display characters associated with the one or more visual display screen locations selected by the user; and comparing said entered security identifier to a predetermined security identifier stored in a database, and if comparison is successful, providing access to said user account.

2. A method according to claim 1, further comprising:
in response to the comparison of the entered security identifier to the predetermined security identifier being successful, querying the user to input one or more additional security identifiers.

3. A method as claimed in claim 2, wherein
incorrect entry of a first security identifier a predetermined number of times results in access to said user account being denied for a predetermined time interval; and
incorrect entry of a subsequent security identifier a predetermined number of times results in access to said user account being disabled.

4. A method according to claim 2, wherein the predetermined character set for each security identifier is different.

5. A method according to claim 2, wherein each security identifier is entered on a separate interface.

6. A method according to claim 1, wherein the one or more visual display screen locations selected by the user are selected using a pointer driven device or a touch screen.

7. A method according to claim 1, further comprising:
in response to determining that a visual display screen location selected by the user corresponds to an excluded character of the graphical display character set, rejecting access to the user account.

8. A method according to claim 1, wherein the user inputs a first part of said security identifier by selecting at least one character on the graphical display character set, and inputs a second part of said security identifier by selecting keys on a traditional keyboard.

9. A method according to claim 1, wherein the predetermined character set and the security identifier are specific to the user.

10. A method according to claim 1, wherein the predetermined character set is proprietary to the user's account administrator.

11. A method according to claim 1, wherein the graphical display character set is displayed in different orders or orientations for each attempted access.

12. A method according to claim 1, further including the step of rejecting access to the user account if an incorrect security identifier is inputted a predetermined number of times.

13. A method according to claim 1, wherein the characters in the predetermined character set include one or more of character types selected from the group consisting of: alphanumeric, punctuation marks, images, pictures and colours.

14. A method for providing access to a user account via an electronic device having a visual display screen, the method including the steps of:
issuing at least one security identifier to the user, said security identifier including one or more characters chosen from a predetermined character set, said predetermined character set being independent of said electronic device, and wherein each character of said predetermined character set is mapped to a master table and provided a master character location;
generating a graphical display character set which includes at least one character from said predetermined character set, and further includes the characters comprising the security identifier, and wherein characters of the graphical display character set are arranged in a random sequence and mapped to said master table;
providing an access interface on said visual display screen for said user to input said security identifier, wherein said access interface includes said graphical display character set;
determining a user character location by allowing said user to input said security identifier by selecting characters on the graphical display character set and identifying the location of the selected characters, the location of the characters of the graphical display character set on the visual display screen being determined by the random sequence;
mapping said user character location to said master character location;
comparing the character stored at said master table location to a predetermined security identifier stored in a database, and if comparison is successful, providing access to said user account.

15. A method as claimed in claim 14 wherein the graphical display character set is arranged in a grid.

16. A non-transitory computer-readable medium having embodied thereon instructions which, when executed by a processor, cause the processor to perform a method for providing access to a user account via an electronic device having a visual display screen, the method including the steps of:
issuing at least one security identifier to the user, said security identifier including one or more characters chosen from a predetermined character set, said predetermined character set being independent of said electronic device and unique to a subset of users;
providing an access interface on said visual display screen for said user to input said security identifier, wherein said access interface includes a graphical display character set which includes at least the characters comprising the security identifier,
the graphical display character set being arranged such that each displayed character is associated with a particular location on the visual display screen,
the graphical display character set being independent of said electronic device;
the association between a particular location on the visual display screen and a displayed character being based on a display sequence determined independent of said electronic device, and
wherein said graphical display character set and said predetermined character set include at least one common character;
allowing said user to select one or more visual display screen locations corresponding to characters on the graphical display character set;
determining an entered security identifier based on the graphical display characters associated with the selected one or more locations; and
comparing said entered security identifier to a predetermined security identifier stored in a database, and if comparison is successful, providing access to said user account.

17. A system for providing access to a user account via an electronic device having a visual display screen, the system including:
a processor in communication with the electronic device via a network;
an input/output device of the processor, the input/output device being for issuing at least one security identifier to the user, said security identifier including one or more characters chosen from a predetermined character set, and said predetermined character set being independent of said electronic device and unique to a subset of users; and
a database in communication with the processor, the database being for storing said at least one security identifier and said predetermined character set;

wherein the processor is configured to:
provide an access interface on said visual display screen for said user to input said security identifier, wherein said access interface includes a graphical display character set which includes at least the characters comprising the security identifier;
the graphical display character set being arranged such that each displayed character is associated with a particular location on the visual display screen,
the graphical display character set being independent of said electronic device;
the association between a particular location on the visual display screen and a displayed character being based on a display sequence determined independent of said electronic device, and
wherein said graphical display character set and said predetermined character set include at least one common character;
determine one or more visual display screen locations selected by the user, the one or more visual display screen locations corresponding to characters on the graphical display character set;
determine an entered security identifier based on the graphical display characters associated with the one or more visual display screen locations selected by the user; and
compare said entered security identifier to the security identifier stored in said database, and compare said entered security identifier to a predetermined security identifier stored in said database, and if comparison is successful, provide access to said user account.

18. A system for providing access to a user account, the system including:
an input/output device for receiving a request to access said user account, and for sending an access interface in response to said request, wherein the access interface includes a graphical display character set which includes at least the characters comprising a security identifier having one or more characters chosen from a predetermined character set;
the graphical display character set being arranged such that each displayed character is associated with a particular location on a visual display screen of an electronic device,
the graphical display character set and the predetermined character set each being independent of said electronic device;
the association between a particular location on the visual display screen and a displayed character being based on a display sequence determined independent of said electronic device, and
wherein
said graphical display character set and said predetermined character set include at least one common character;
the predetermined character set is unique to a subset of users;
the display character set is configured to allow a user to select one or more visual display screen locations corresponding to characters on the graphical display character set; and
an entered security identifier is determined based on the graphical display characters associated with the one or more visual display screen locations selected by the user; and a processor in communication with said input/output device and said electronic device via a network, the processor being for receiving and comparing said entered security identifier to a predetermined security identifier stored in a database, and if comparison is successful, providing access to said user account.

19. A system for providing access to a user account, the system including:
an input/output device for receiving at least one security identifier, said security identifier including one or more characters chosen from a predetermined character set; and
an electronic device in communication with said input/output device over a network, the electronic device having a visual display screen adapted for
requesting access to a user account, and for receiving an access interface to input said security identifier, wherein the access interface includes a graphical display character set which includes at least the characters comprising the security identifier,
the graphical display character set being arranged such that each displayed character is associated with a particular location on the visual display screen,
the graphical display character set and the predetermined character set each being independent of said electronic device;
the predetermined character set being unique to a subset of users;
the association between a particular location on the visual display screen and a displayed character being based on a display sequence determined independent of said electronic device, and
wherein said graphical display character set and said predetermined character set include at least one common character;
for allowing said user to select one or more visual display screen locations corresponding to characters on the graphical display character set;
for determining an entered security identifier based on the graphical display characters associated with the selected one or more locations; and
for accessing said user account if comparison between said entered security identifier and a predetermined security identifier stored in a database is successful.

20. A system according to claim 17 or claim 18 or claim 19, wherein the one or more visual display screen locations selected by the user are selected using a pointer driven device or a touch screen.

21. A system according to claim 17 or claim 18 or claim 19, the processor being further configured for rejecting access to the user account if an incorrect security identifier is inputted a predetermined number of times.

22. A system according to claim 17 or claim 18 or claim 19, wherein the security identifier is partially inputted by selecting at least one character on the graphical display character set, and partially inputted by selecting keys on a traditional keyboard.

23. A system according to claim 17 or claim 18 or claim 19, wherein the characters in the predetermined character set include one or more of character types selected from the group consisting of: alpha-numeric, punctuation marks, images, pictures and colours.

24. A system according to claim 17 or claim 18 or claim 19, wherein the graphical display character set is displayed in different orders or orientations for each attempted access.

25. A system according to claim 17 or claim 18 or claim 19, the processor being further configured for rejecting access to the user account if an excluded character is selected from the graphical display character set.

26. A system according to claim 17 or claim 18 or claim 19, wherein the predetermined character set and security identifier is variable for each user.

27. A system according claim 17 or claim 18 or claim 19, wherein predetermined character set is proprietary to the user's account administrator.

* * * * *